(12) United States Patent
Hiraga et al.

(10) Patent No.: US 7,859,976 B2
(45) Date of Patent: Dec. 28, 2010

(54) OPTICAL PICKUP DEVICE

(75) Inventors: Takayoshi Hiraga, Kanagawa-ken (JP); Takahiro Kaneko, Kanagawa-ken (JP); Minoru Ohyama, Kanagawa-ken (JP)

(73) Assignee: Victor Company of Japan, Limited, Yokohama-shi, Kanagawa-ken (JP)

( * ) Notice: Subject to any disclaimer, the term of this patent is extended or adjusted under 35 U.S.C. 154(b) by 1051 days.

(21) Appl. No.: 11/595,869

(22) Filed: Nov. 13, 2006

(65) Prior Publication Data

US 2007/0109946 A1 May 17, 2007

(30) Foreign Application Priority Data

Nov. 16, 2005 (JP) ............................. P2005-331042
Jul. 21, 2006 (JP) ............................. P2006-198954

(51) Int. Cl.
*G11B 7/00* (2006.01)

(52) U.S. Cl. ............................. 369/112.05; 369/44.23; 369/112.01; 369/122.07; 369/112.04; 369/112.15

(58) Field of Classification Search ............... 369/112, 369/112.01, 112.04, 112.05, 112.07, 112.15, 369/44.23
See application file for complete search history.

(56) References Cited

U.S. PATENT DOCUMENTS

| | | | | |
|---|---|---|---|---|
| 5,850,380 A | * | 12/1998 | Kubo | 369/112.04 |
| 6,137,752 A | * | 10/2000 | Sakai | 369/44.23 |
| 6,909,687 B2 | * | 6/2005 | Mori et al. | 369/112.07 |
| 2005/0094511 A1 | * | 5/2005 | Nakao | 369/44.37 |
| 2006/0092778 A1 | * | 5/2006 | Shibuya et al. | 369/44.23 |

FOREIGN PATENT DOCUMENTS

| | | |
|---|---|---|
| JP | 05-101417 | 4/1993 |
| JP | 08-063761 | 3/1996 |
| JP | 10-241187 A | 9/1998 |
| JP | 11-283274 | 10/1999 |
| JP | 2001-344771 A | 12/2001 |
| JP | 2002-216368 | 8/2002 |

OTHER PUBLICATIONS

Machine translation of JP application 08063761 by Sakuyama Hiroyuki on Mar. 8, 1996.*

* cited by examiner

*Primary Examiner*—Wayne R Young
*Assistant Examiner*—Linh T Nguyen
(74) *Attorney, Agent, or Firm*—The Nath Law Group; Jerald L. Meyer; Stanley N. Protigal

(57) ABSTRACT

In a photo pickup device, an incident area 30 for a reflection light of a light spot is divided into four areas 30a~30d by parting lines 31, 32 making axial-symmetrical angles with a direction Y of a projected track on an optical disc. In these areas, the so-divided areas 30a, 30c are formed so as to diffract the light in one or more directions in a range of 90 degrees±20 degrees to the direction Y and impress misalignment on each diffraction light. In each diffraction light, two focal lines produced due to the astigmatism make approx. 45 degrees with the direction Y of the projected track. Further, the divided areas 30b, 30d are characterized by diffracting the light in one or more directions in a range of 90 degrees±20 degrees to the direction Y.

2 Claims, 27 Drawing Sheets

NO MISALIGNMENT

LIGHT SPOT ON PHOTO DETECTIVE ELEMENT

MISALIGNMENT

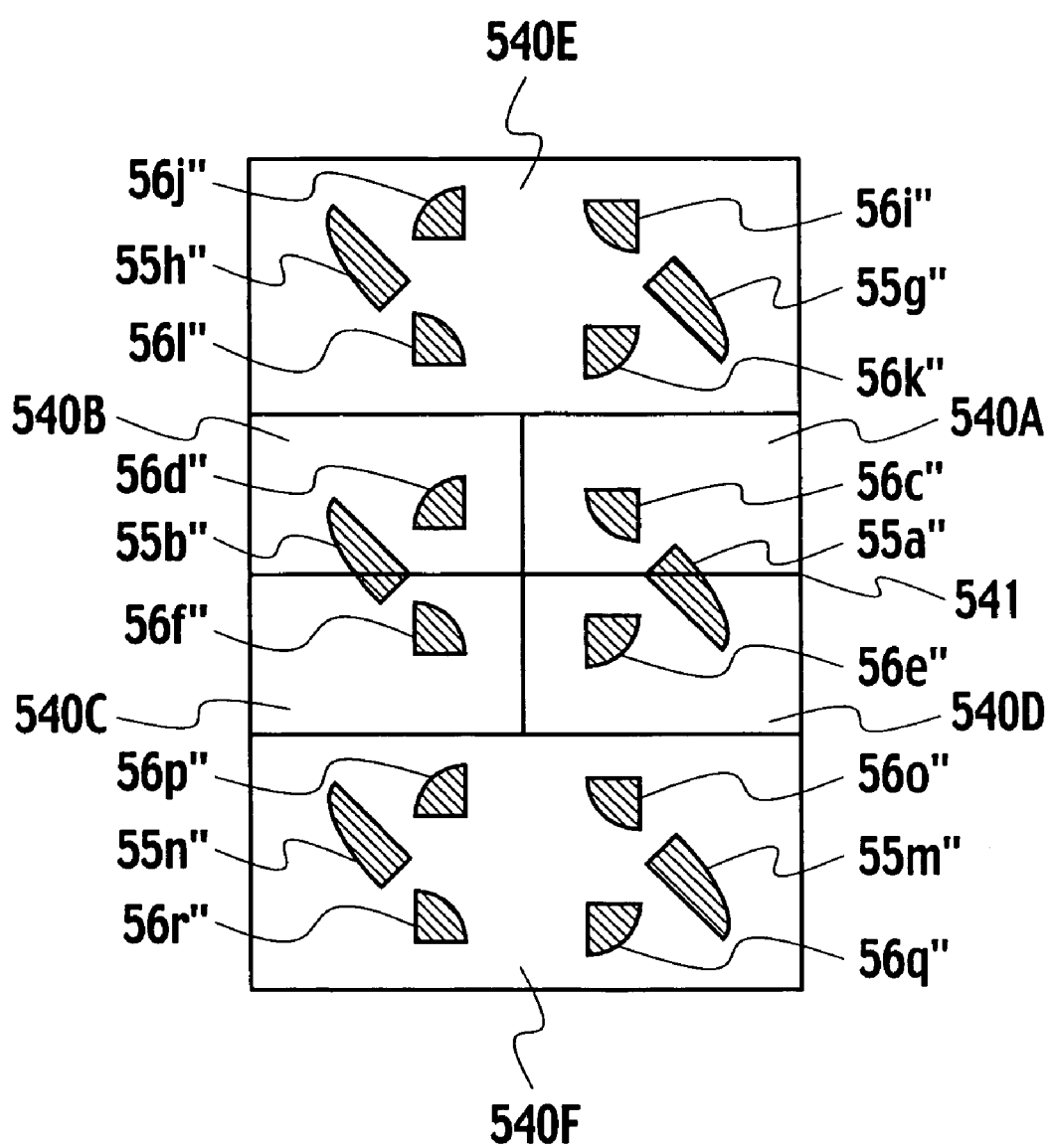

OPTICAL PICKUP DEVICE

BACKGROUND OF THE INVENTION

1. Field of the Invention

The present invention relates to optical pickup devices, and more particularly, an optical pickup device which includes a hologram element as a detection optical element and which carries out recording/playing of information in relation to an optical disc optically.

2. Description of the Related Art

In such an optical pickup device that carries out recording/playing of information in relation to an optical disc optically, there have been adopted an astigmatism method for detecting a focus-servo error signal and a push-pull method for detecting a tracking-servo error signal.

FIG. 1 is a structural view showing one example of a conventional optical pickup device. In the figure, light radiated from a light source 1 is reflected by a beam splitter 5, transmitted through a collimator lens 4 and converged by an objective lens 3 to form a light spot 2a in an optical disc 2. Then, the light (the light spot 2a) is reflected by the optical disc 2 and enters the objective lens 3 again. Subsequently, the light spot 2a is transmitted through the collimator lens 4, the beam splitter 5 and a cylinder lens 6, in this order. Astigmatism is imparted to the light since it passes through the cylinder lens 6. Then, the light enters a photo detective element 7 having four divided detective areas placed in two rows and two columns, forming a light spot on the photo detective element 7.

As the light entering the photo detective element 7 has astigmatism imparted by the cylinder lens 6, if changing a relative distance between the objective lens 3 and the optical disc 2, then the light spot formed in the photo detective element 7 changes its configuration as shown in FIGS. 2A, 2B and 2C. That is, by picking up outputs A, B, C and D of four-divided detective parts 7A, 7B, 7C and 7D and successively calculating the expression (A+C)−(B+D) from these outputs, it becomes possible to detect a focus error signal in accordance with the astigmatism method.

Regarding detection of a tracking error signal, there is utilized a phenomenon that if a relative position of the light spot 2a to a track in the optical disc 2 in its radial direction changes, an optical-power distribution (in a radial direction) of the light spot formed on the photo detective element 7 changes as shown in FIGS. 3A, 3B and 3C with respective parts 7d, 7e and 7f. That is, by picking up the outputs A, B, C and D of the four-divided detective parts 7A, 7B, 7C and 7D and successively calculating the expression (A+B)−(C+D) from these outputs, it becomes possible to detect a tracking error signal in accordance with the push-pull method.

As a reference, FIG. 3B shows an optical-power distribution when there is no deviation in tracking (misalignment), while FIGS. 3A and 3C show optical-power distributions in case of misalignments in different directions. Throughout FIGS. 3A to 3C, shaded areas designate parts bedimmed as a result of interference between ±first diffraction lights and zero-order diffraction light in the reflection light from the optical disc.

According to a differential phase detection method as a standard method for detecting a tracking error in DVD (Digital Versatile Disc), it is also possible to detect a tracking error signal by comparing a phase of a calculation signal of (A+C) with a phase of a calculation signal of (B+D). Additionally, information recorded on the optical disc 2 can be detected by calculating the expression (A+B+C+D) from the outputs A, B, C and D of the four-divided detective parts 7A, 7B, 7C and 7D of the photo detective element 7.

As mentioned above, since the calculating of the outputs A, B, C and D of the four-divided detective parts 7A, 7B, 7C and 7D allows two kinds of servo-error signals and the signals recorded in the optical disc 2 to be detected, all of the astigmatism method, the push-pull method and the above-mentioned "phase-difference" method have advantages of easiness in calculation and small number of output terminals. This is one reason why these methods have been used widely.

However, if a misalignment is produced in the relative positions of the beam splitter 5, the collimator lens 4, the objective lens 3, the cylinder lens 6 and the photo detective element 7, then the position of the light spot formed on the photo detective element 7 would change as shown in FIGS. 4A and 4B. In such a case, it is impossible to detect an error signal precisely due to variations in the outputs of the four-divided detective parts 7A, 7B, 7C and 7D of the photo detective element 7. Therefore, the conventional pickup device of FIG. 1 is required to establish the relative positions of these constituents with high accuracy.

Further, since the respective components (i.e. the light source 1, the beam splitter 5, the collimator lens 4, the objective lens 3, the cylinder lens 6 and the photo detective element 7) have to be disposed apart from each other by predetermined distances, the arrangement might be an obstacle in miniaturizing the photo pickup device. As it is unavoidable that the performances of the cylinder lens 6, the beam splitter 5 and the collimator lens 4 and the assembling positions of constituents of the light source 1 (including a semiconductor laser) fluctuate, it is required to adjust the assembling positions of the cylinder lens 6 and the photo detective element 7, taking a lot of trouble and time with the production of an optical pickup device. Further, depending on variations per hour in the assembling positions of the constituents, it becomes impossible to detect a designated error signal.

As another focus-error detecting method for remedying these shortcomings of the astigmatism method, there is a spot-size method adopting a hologram element, in practical use (e.g. see Japanese Patent Laid-open Publication No. H05 (1993)-101417). FIG. 5 shows one example of a conventional optical pickup device using such a hologram element. In operation, light radiated from a light source 8 is transmitted to an objective lens 12 through a hologram element 10 and a collimator lens 11 successively. By the objective lens 12, the transmitted light is converged to form a light spot 13a in the optical disc 13. Then, the light spot 13a is reflected by the optical disc 13 and subsequently transmitted through the objective lens 12 and the collimator lens 11, entering the hologram element 10.

Then, the incident light is diffracted into two lights by the hologram element 10 and emitted in the form of a first diffraction light 14a having a shortened focal length due to a convex-lens action of the element 10 and a second diffraction light 14b having an extended focal length due to a concave-lens action of the element 10. These diffraction lights 14a and 14b reach a photo detective element 9, forming respective light spots 9a and 9b thereon. Note that, as shown in FIGS. 6A–6C, the photo detective element 9 comprises a first tripartition detective part 9A for the light spot 9a and a second tripartition detective part 9B for the light spot 9b. These tripartition detective parts 9A and 9B are connected with each other as illustrated in the figures, generating output signals F1, F2. Each of the tripartition detective parts 9A and 9B is composed of three lines and one column of detective components.

As the focal lengths of two diffraction lights 14a, 14b for the photo detective element 9 are different from each other, the light spots formed on respective detective surfaces of the tripartition detective parts 9A and 9B forming the photo detective element 9 change their sizes as shown in FIGS. 6A, 6B and 6C, corresponding to a change (increasing or decreasing) in the relative distance between the objective lens 12 and the optical disc 13. Thus, with the so-illustrated connection between the tripartition detective parts 9A and 9B and the calculation of the expression (F1−F2) using signals F1 and F2 outputted from the tripartition detective parts 9A and 9B, it is possible to detect a focus error signal in accordance with the spot-size method. In connection, information recorded in the optical disc 13 can be detected by calculating the expression (F1+F2) from the signals F1 and F2.

In the spot-size method for detecting the focus error signal, it is general that the photo detective element 9 is divided in only one direction (see FIGS. 6A~6C) and the direction of respective parting lines coincides with a direction that would be obtained by projecting a radial direction of the photo disc 13 on the photo detective element 9. The reason for coincidence in direction is as follows. That is, when the objective lens 12 moves in the radial direction of the photo disc 13 in order to allow the light spot 13a to follow a track on the optical disc 13, the light spots 9a and 9b on the tripartition detective parts 9A and 9B move in the radial direction of the photo disc 13 as well. Accordingly, it is required to minimize the effects of light spots' moving on the photo detective element 9 on the focus error signal. This is the reason why the direction of parting lines coincides with the radial direction of the photo disc 13. In this view, it should be said that the above-mentioned push-pull method is not available since it is constructed to detect a tracking error signal by making use of a difference in the optical power distribution between left and right detective parts, which is similar to the operation of the photo detective element 7 in the astigmatism method.

Instead, it is often the case that the conventional photo pickup device using a hologram element is combined with a three-beam method (e.g. see Japanese Patent Laid-open Publication No. H11(1999)-283274). FIG. 7 shows this three-beam method schematically. According to the three-beam method, three light spots 15a, 15b and 15c are formed on a photo disc having pits (marks) 16, while a photo detective element (not shown) detects respective reflection lights of these light spots 15a, 15b and 15c. With the application of the three-beam method, a reflection light of the center light spot 15a formed on the photo disc is diffracted by the hologram element 10, so that one diffraction light enters the photo detective element 17A having the tripartition detective parts of FIG. 8 (corres. to the part 9A of FIGS. 6A~6B), while the other diffraction light enters the photo detective element 17D having the tripartition detective parts of FIG. 8 (corres. to the part 9B of FIGS. 6A~6B). In accordance with the aforementioned spot-size method, these diffraction lights are utilized to detect the focus error signals and the information recorded in the photo disc.

Further, the reflection lights of the light spots 15b, 15c arranged in the vicinity of the light spot 15a of FIG. 7 in the track scanning direction are respectively diffracted by the hologram element 10, so that two diffraction lights for the light spot 15b enter the photo detective elements 17B, 17E of FIG. 8, respectively and two diffraction lights for the light spot 15c enter the photo detective elements 17C, 17F of FIG. 8, respectively. Through the use of an action that the detective powers of the photo detective elements 17B, 17C and the photo detective elements 17E, 17F increase and decrease mutually in response to a change in the relative position of the light spot 15a to a track in the radial direction of the photo disc, the tracking error signal can be detected by calculating (T1−T2) from T1 as an addition output signal of the photo detective elements 17B and 17E and T2 as an addition output signal of the photo detective elements 17C and 17F.

The above-mentioned photo pickup device using the hologram element can allow a single hologram element 10 to cater for two actions of the beam splitter 5 and the cylinder lens 6 used in the conventional photo pickup device of FIG. 1. Additionally, as the hologram element 10 can be manufactured in small size and with high accuracy, it is possible to assemble the photo detective element 9 and the semiconductor laser (i.e. the light source 8) in the vicinity of the hologram element 10 integrally, facilitating a miniaturization of the optical pickup device in comparison with the conventional photo pickup device using the astigmatism method (FIG. 1).

Additionally, since the photo detective element 9, the semiconductor laser (the light source 8) and the hologram element 10 can be assembled to each other closely, it is possible to minimize a deviation of the relative position between the semiconductor laser and the hologram element 10 remarkably. Additionally, it is noted that the hologram element 10 is characterized in that a relative angle between an incident light into the element 10, which has been radiated from the semiconductor laser (the light source 8), and an exit light from the element 10, which has been reflected by the photo disc 13 and further diffracted by the element 10, becomes constant usually. Therefore, even if the relative positions of the hologram element 10, the collimator lens 11 and the objective lens 12 are subjected to some deviations, it is possible to form a light spot in a designated position on the photo detective element 9 so long as no deviation is produced in the relative position between the photo detective element 9 and the semiconductor laser (the light source 8).

Furthermore, even if a deviation is produced in the relative position between the photo detective element 9 and the light source 8, the focus error signal would not change so long as a direction of the parting line between the divided detective parts 9A and 9B of the photo detective element 9 is substantially identical to a direction of the deviation (due to no change in the optical power distributions in the divided detective parts 9A and 9B). The optical pickup device using the hologram element is characterized by the above-mentioned features and has various advantages (e.g. easiness for miniaturization, easiness for ensuring high reliability, etc.) in comparison with the conventional pickup device of FIG. 1.

In a photo pickup device in accordance with the spot-size method adopting a conventional hologram element, however, a method for calculating output signals is different from that in the above-mentioned astigmatism method. It means that it is impossible to convert electric signal processing circuits widely used in the astigmatism method to a circuits for the photo pickup device. Thus, the existing circuit for the astigmatism method has to be modified so as to meet with the spot-size method.

Alternatively, if adopting the push-pull method or the phase-difference method in order to detect the tracking error signal, it would be required to detect the optical power distribution of light spots on the photo detective element while being divided in two parts in the radial direction or in the track direction of the photo disc. Then, this requirement is accompanied with various modifications, for instance, dividing of the hologram element 10 into one area corresponding to an outer circumferential part of the photo disc and another area corresponding to the inner circumferential part, dividing of respective intermediate detective parts of the tripartition detective parts 9A and 9B (FIGS. 6A~6C) in two furthermore.

Thus, although the conventional photo pickup device adopting a hologram element is easy to be small-sized in comparison with the conventional photo pickup device shown in FIG. 1, there is a limit to the miniaturization due to the large-sized photo detective element 9 and an increase in the number of output terminals. Further, since the calculation of output signals is complicated, drastic changes would be required for widely-used electric signal processing circuits dealing with the astigmatism method.

In this way, the conventional photo pickup device has been required to accomplish both the merits in the astigmatism method (i.e. easiness in calculation, reduced number of output terminals, capability of detecting the tracking error signal by the push-pull method or the phase-difference method without adding the photo detective element or increasing the number of output terminals) and the merits in the spot-size method using the hologram element (i.e. high reliability, easiness for miniaturization).

SUMMARY OF THE INVENTION

Under a situation mentioned above, an object of the present invention is to provide an optical pickup device capable of providing the advantages of the astigmatism method and the advantages of the spot-size method using a hologram element, simultaneously.

In order to achieve the above object, according to a first aspect of the present invention, there is provided an optical pickup device comprising: a light source for radiating a light; an objective lens that converges the light radiated from the light source onto an optical disc to form a light spot thereon; a detection optical element that emits a reflection light of the light spot on the optical disc to a predetermined direction, the reflection light entering the detection optical element through the objective lens; and a photo detective element that receives the light emitted from the detection optical element and outputs an electric signal corresponding to an optical power of the light, wherein the detection optical element has an incident area for the reflection light of the light spot, which is divided into four or more divided areas by parting lines making axis-symmetric angles with a direction of a track on the optical disc, the direction of the track being obtained by projecting the track on the detection optical element, the divided areas having first and second divided areas containing a same direction as the direction of the track, the first and second divided areas being characterized by each diffracting a light to one or more directions in a range of 90 degrees±20 degrees to the direction of the track and each impressing astigmatism on resulting diffraction lights so that two focal lines produced in each of the diffraction lights by the astigmatism extend in directions making approximately 45 degrees with the direction of the track; the photo detective element is arranged so as to receive a light between the two focal lines produced in each of the diffraction lights having the astigmatism impressed by the first and second divided areas; and the photo detective element is constructed so as to receive each of the diffraction lights, which have been emitted in diffraction from at least the first and second divided areas, by at least two divided detective parts that are divided by a parting line extending in a substantially-same direction as a direction of the diffraction, individually.

According to a second aspect of the invention, in the optical pickup device of the first aspect, the detection optical element is characterized in that two or more divided areas of the four or more divided areas but the first and second divided areas diffract a light to one or more directions in a range of 90 degrees±20 degrees to the direction of the track; and the photo detective element is constructed so as to receive each of the diffraction lights, which have been emitted in diffraction from the two or more divided areas but the first and second divided areas, by at least two divided detective parts that are divided by the parting line extending in a substantially-same direction as the direction of the diffraction, individually.

According to a third aspect of the present invention, there is also provided an optical pickup device comprising: a light source for radiating light; an objective lens that converges the light radiated from the light source onto an optical disc to form a light spot thereon; a detection optical element that emits a reflection light of the light spot on the optical disc to a predetermined direction, the reflection light entering the detection optical element through the objective lens; and a photo detective element that receives the light emitted from the detection optical element and outputs an electric signal corresponding to an optical power of the light, wherein the detection optical element has an incident area for the reflection light of the light spot, which is divided into four or more divided areas by parting lines making axis-symmetric angles with a direction of a track on the optical disc, the direction of the track being obtained by projecting the track on the detection optical element, the divided areas having first and second divided areas containing a same direction as the direction of the track, the first and second divided areas being characterized by each diffracting a light to one or more directions in a range of 90 degrees±20 degrees to the direction of the track and each impressing astigmatism on resulting diffraction lights so that two focal lines produced in each of the diffraction lights by the astigmatism extend in directions making approximately 45 degrees with the direction of the track, the detection optical element being further characterized in that two or more divided areas of the four or more divided areas but the first and second divided areas diffract light to one or more directions in a range of 90 degrees±20 degrees to the direction of the track and also impress astigmatism on respective diffraction lights so that two focal lines produced by the astigmatism extend in directions making approximately 0 degree and 90 degrees with the direction of the track; and the photo detective element is arranged so as to receive light between the two focal lines produced by the diffraction lights having the astigmatism impressed by the first and second divided areas and constructed so as to receive the diffraction lights, which have been emitted in diffraction from the four or more divided areas, by at least two divided detective parts that are divided by a parting line extending in a substantially-same direction as a direction of the diffraction, individually.

According to a fourth aspect of the present invention, there is also provided an optical pickup device comprising: a light source for radiating light; an objective lens that converges the light radiated from the light source onto an optical disc to form a light spot thereon; a detection optical element that emits a reflection light of the light spot on the optical disc to a predetermined direction through a diffraction element, the reflection light entering the detection optical element through the objective lens; and a photo detective element that receives the light emitted from the detection optical element and outputs an electric signal corresponding to an optical power of the light, wherein the detection optical element has an incident area for the reflection light of the light spot, which is divided into six divided areas by parting lines making axis-symmetric angles with a direction of a track on the optical disc, the direction of the track being obtained by projecting the track on the detection optical element, the six divided areas including first and second divided areas containing a same direction as the direction of the track, the first and second divided areas being characterized by diffracting a light to one or more directions in a range of 90 degrees±20 degrees to the direction of the track and each impressing astigmatism on resulting diffraction lights, both two first focal lines produced by the astigmatism impressed by the first divided area and two second focal lines produced by the astigmatism impressed by the second divided area extend in directions making approximately 45 degrees with the direction of the track projected on the diffraction element, one of the two first focal lines closer to the detection optical element extending in a substantially-same direction as one of the two second focal lines closer to the detection optical element; the six divided areas includes third and fourth divided areas both adjoining the first divided area and fifth and sixth divided areas both adjoining the second divided area, each of the third to the sixth divided areas diffracting light to one or more directions in a range of 90 degrees±20 degrees to the direction of the track; the photo detective element is arranged so as to receive a light between the two first focal lines and between the two second focal lines, which are produced by the diffraction lights having the astigmatism impressed by the first and second divided areas; and wherein at least in a state where the light through the objective lens converges on the optical disc to form the light spot; the diffraction light emitted in diffraction from the first divided area is received by both of first and second divided detective parts of the photo detective element, which are divided by a first parting line extending in a substantially-same direction as a direction of the diffraction; the diffraction light emitted in diffraction from the second divided area is received by both of third and fourth divided detective parts of the photo detective element, which are divided by a second parting line extending in a substantially-same direction as a direction of the diffraction; the diffraction light emitted from the third divided area and the diffraction light emitted from the fourth divided area are converged by the detection optical element and further received by the first and second divided detective parts individually; and the diffraction light emitted from the fifth divided area and the diffraction light emitted from the sixth divided area are converged by the detection optical element and further received by the third and fourth divided detective parts individually.

According to a fifth aspect of the present invention, in the optical pickup device of the fourth aspect, the detection optical element is constructed so that, at least in the state where the light spot formed by the light converging on the optical disc through the objective lens has a smallest diameter, light spots formed on the first divided detective part and the second divided detective part by diffraction lights through the third divided area and the fourth divided area do not overlie a light spot formed on the first divided detective part and the second divided detective part by a diffraction light through the first divided area, and light spots formed on the third divided detective part and the fourth divided detective part by diffraction lights through the fifth divided area and the sixth divided area do not overlie a light spot formed on the third divided detective part and the fourth divided detective part by a diffraction light through the second divided area.

According to a sixth aspect of the present invention, in the optical pickup device of the fourth aspect, each of the third to the sixth divided areas is further characterized by diffracting a reflection light of the light spot on the optical disc, the reflection light entering through the objective lens, to one or more directions in a range of 90 degrees±20 degrees to the direction of the track and simultaneously impressing astigmatism on a resulting diffraction light, only either one of two first focal lines produced in the diffraction lights by the astigmatism extending in a range of 90 degrees±20 degrees to the direction of the track projected on the detection optical element; and at least in the state where the light spot formed by the light converging on the optical disc through the objective lens has a smallest diameter, a first light spot, which is formed on either of the first and the second divided detective parts when diffraction lights from the third and the fourth divided areas reach the photo detective element, has one diameter "$d1x$" larger than another diameter "$d1y$" where the diameter "$d1x$" is a diameter in a same direction as a first parting line between the first divided detective part and the second divided detective part and the diameter "$d1y$" is a diameter in a direction perpendicular to the first parting line, and a second light spot, which is formed on either of the third and the fourth divided detective parts when diffraction lights from the fifth and the sixth divided areas reach the photo detective element, has one diameter "$d2x$" larger than another diameter "$d2y$" where the diameter "$d2x$" is a diameter in a same direction as a second parting line between the third divided detective part and the fourth divided detective part and the diameter "$d2y$" is a diameter in a direction perpendicular to the second parting line.

In order to achieve the above object, assuming that: the first divided area of the detection optical element is formed by an area allowing an entrance of a pit projected on the detection optical element; the second divided are is formed by an area allowing a discharge of the pit; when the first and the second divided areas are respectively divided in two by a direction of a track projected on the detection optical element as a boundary, resulting left areas in view of a direction of the entrance of the pit projected on the detection optical element are represented by areas 1L and 2L respectively, while resulting right areas are represented by areas 1R and 2R respectively; the third divided area and the fourth divided area of the detection optical element are formed, in view from a direction of the entrance of a pit projected on the detection optical element, by left and right areas respectively; when the third and the fourth divided areas are respectively divided in two by a direction as a boundary making a right angle with the direction of the track projected on the detection optical element, resulting areas on the side of an entrance of the pit projected on the detection optical element are represented by areas 3F and 4F respectively, while resulting areas on the side of a discharge of the pit projected on the detection optical element are represented by areas 3E and 4E respectively; in photo detective areas obtained by dividing the first divided area into at least two, the photo detective areas corresponding to the area 1L and the area 1R are represented by a photo detective area 1L and a photo detective area 1R respectively; respective electrical outputs from the photo detective area 1L and the photo detective area 1R are represented by an output 1L and an output 1R respectively; in photo detective areas obtained by dividing the second divided area into at least two, the photo detective areas corresponding to the area 2L and the area 2R are represented by a photo detective area 2L and a photo detective area 2R respectively; respective electrical outputs from the photo detective area 2L and the photo detective area 2R are represented by an output 2L and an output 2R respectively; in photo detective areas obtained by dividing the third divided area into at least two, the photo detective areas corresponding to the area 3F and the area 3E are represented by a photo detective area 3F and a photo detective area 3E respectively;

respective electrical outputs from the photo detective area 3F and the photo detective area 3E are represented by an output 3F and an output 3E respectively; and in photo detective areas obtained by dividing the fourth divided area into at least two, the photo detective areas corresponding to the area 4F and the area 4E are represented by a photo detective area 4F and a photo detective area 4E respectively; respective electrical outputs from the photo detective area 4F and the photo detective area 4E are represented by an output 4F and an output 4E respectively, the present invention is characterized by adding the output 1L to the output 3F, adding the output 3E to the output 2L, adding the output 2R to the output 4E, and adding the output 4F to the output 1R, respectively.

In order to achieve the above object, assuming that: the first divided area of the detection optical element is formed by an area allowing an entrance of a pit projected on the detection optical element; the second divided are is formed by an area allowing a discharge of the pit; when the first and the second divided areas are respectively divided in two by a direction of a track projected on the detection optical element as a boundary, resulting left areas in view of a direction of the entrance of the pit projected on the detection optical element are represented by areas 1L and 2L respectively, while resulting right areas are represented by areas 1R and 2R respectively; the third divided area and the fourth divided area of the detection optical element are formed, in view from a direction of the entrance of a pit projected on the detection optical element, by left and right areas respectively; when the third and the fourth divided areas are respectively divided in two by a direction as a boundary making a right angle with the direction of the track projected on the detection optical element, resulting areas on the side of an entrance of the pit projected on the detection optical element are represented by areas 3F and 4F respectively, while resulting areas on the side of a discharge of the pit projected on the detection optical element are represented by areas 3E and 4E respectively; in photo detective areas obtained by dividing the first divided area into at least two, the photo detective areas corresponding to the area 1L and the area 1R are represented by a photo detective area 1L and a photo detective area 1R respectively; respective electrical outputs from the photo detective area 1L and the photo detective area 1R are represented by an output 1L and an output 1R respectively; in photo detective areas obtained by dividing the second divided area into at least two, the photo detective areas corresponding to the area 2L and the area 2R are represented by a photo detective area 2L and a photo detective area 2R respectively; respective electrical outputs from the photo detective area 2L and the photo detective area 2R are represented by an output 2L and an output 2R respectively; in photo detective areas obtained by dividing the third divided area into at least two, the photo detective areas corresponding to the area 3F and the area 3E are represented by a photo detective area 3F and a photo detective area 3E respectively; respective electrical outputs from the photo detective area 3F and the photo detective area 3E are represented by an output 3F and an output 3E respectively; and in photo detective areas obtained by dividing the fourth divided area into at least two, the photo detective areas corresponding to the area 4F and the area 4E are represented by a photo detective area 4F and a photo detective area 4E respectively; respective electrical outputs from the photo detective area 4F and the photo detective area 4E are represented by an output 4F and an output 4E respectively, the present invention is characterized in that the photo detective area 1L is identical to the photo detective area 3F; the photo detective area 3E is identical to the photo detective area 2L; the photo detective area 2R is identical to the photo detective area 4E; and that the photo detective area 4F is identical to the photo detective area 1R.

BRIEF DESCRIPTION OF THE DRAWINGS

FIG. 35 is a view showing the constitution of the photo detective element of the sixth embodiment of the present invention and second configurations of the detective spots when the relative distance between the objective lens and the optical disc changes in relation to the in-focus position.

DETAILED DESCRIPTION OF THE PREFERRED EMBODIMENTS

1st. Embodiment

Figure 9:
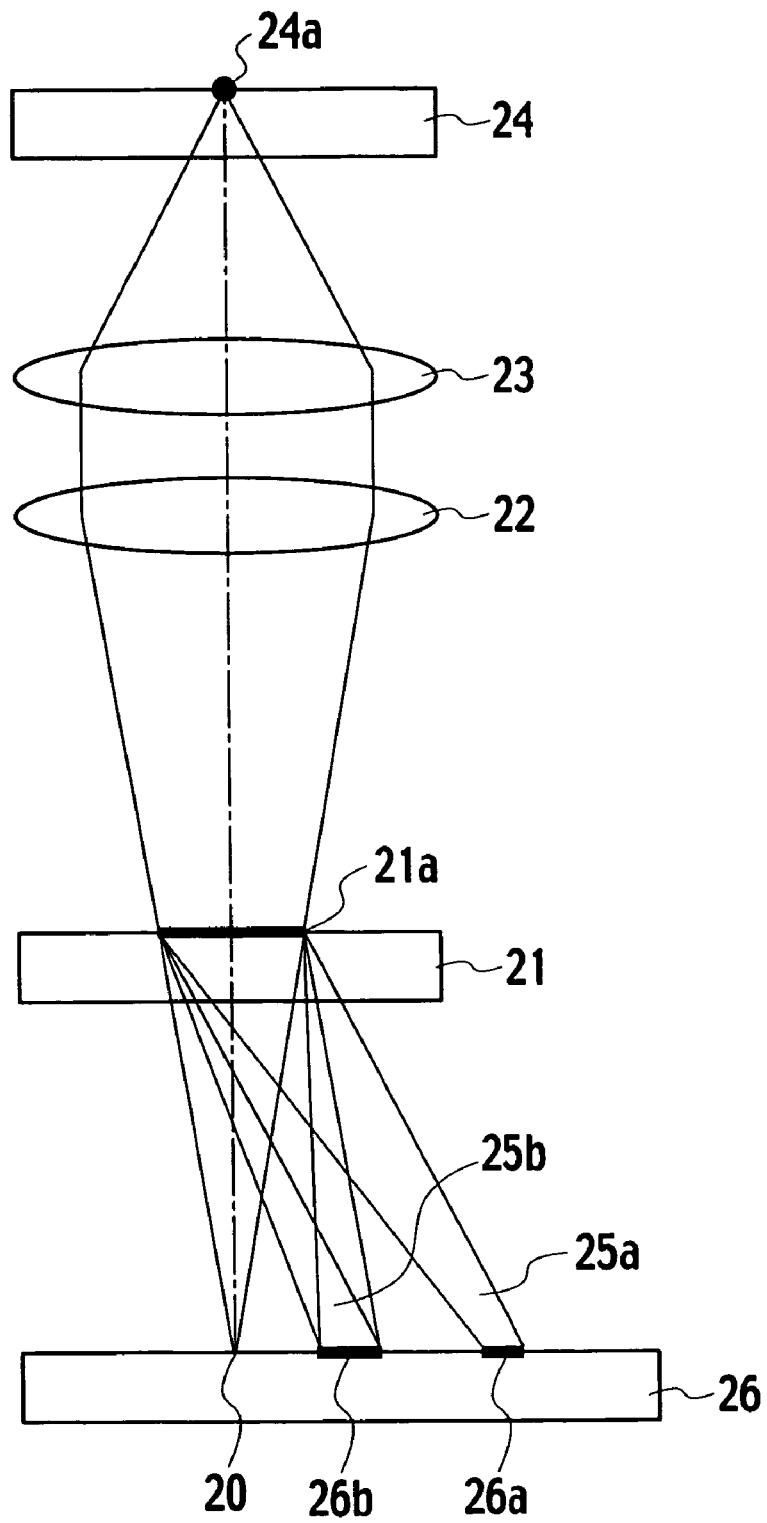
FIG. 9 is a structural view of an optical pickup device in accordance with a first embodiment of the present invention.

FIG. 9 is a structural view of an optical pickup device in accordance with a first embodiment of the present invention. In the figure, light radiated from a semiconductor laser 20 as a light source is transmitted through a hologram element 21, a collimator lens 22 and an objective lens 23, in order. Then, the light is converged by the objective lens 23 to form a light spot 24a on an optical disc 24. The optical disc 24 is formed by, for example, CD (Compact Disc), DVD (Digital Versatile Disc) or the like.

The light spot 24a is reflected by the optical disc 24 and successively transmitted to the hologram element 21 through the objective lens 23 and the collimator lens 22, in order. The reflection light reflected from the optical disc 24 and entering an area 21a of the hologram element 21 is emitted in diffraction, in the form of two diffraction lights 25a, 25b. These diffraction lights 25a, 25b enter a photo detective element 26 and form two light spots 26a, 26b on the same element 26.

Figure 10:
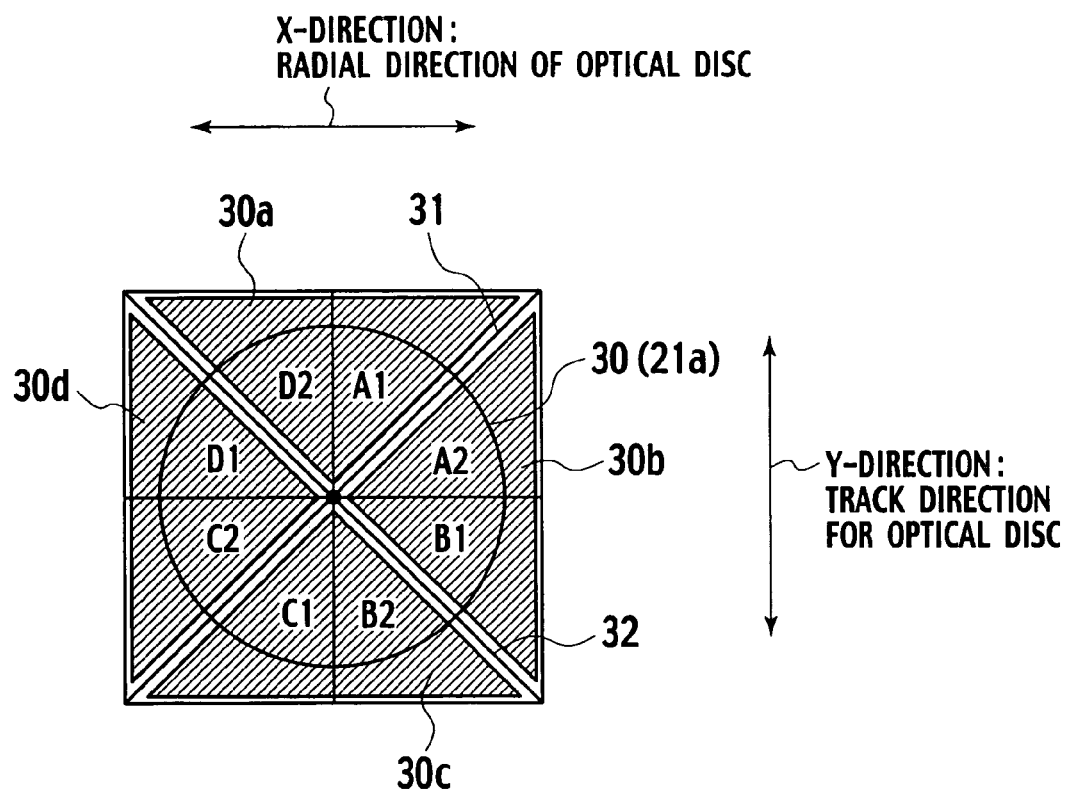
FIG. 10 is a view showing respective areas on a hologram element used in the optical pickup devices in accordance with the first to fourth embodiments of the present invention.

A hologram-element plane of the hologram element 21 of FIG. 9 looks like FIG. 10, in a view from the collimator lens 22. In FIG. 9, reference numeral 21a denotes an area of the hologram element 21 through which the reflection light of the light spot 24a on the optical disc 24 is transmitted. In FIG. 10, a circular area 30 corresponds to the above area 21a. As for FIG. 10, it is now defined that a direction Y (or "Y direction") represents a direction which would be obtained by projecting a track direction of the optical disc 24 on the hologram element 21. Further, it is defined that a direction X (or "X direction") represents a direction which would be obtained by projecting a radial direction of the optical disc 24 on the hologram element 21. Under these definitions, a hologram pattern of the hologram element 21 is divided into four areas 30a, 30b, 30c and 30d (FIG. 10) by two parting lines 31, 32 making 45 degrees with the directions X and Y. Further, each of four divided areas 30a, 30b, 30c and 30d is divided into two zones in the direction X or Y, establishing various areas A1, A2, B1, B2, C1, C2, D1 and D2, as shown in FIG. 10. Note that the direction Y of a track projected on the hologram element 21 will be referred to as "track direction Y" after.

In these divided areas, the divided area 30a is identical to an area where a pit recorded in a track of the optical disc and projected on the hologram element 21 goes in. On the other hand, the divided area 30c is identical to an area where the pit goes out. Additionally, when the divided areas 30a and 30c are respectively divided in two on the border of the direction Y of the track projected on the hologram element 21, the left-side areas (in view of an incoming direction of a pit projected on the hologram element 21) correspond to the areas A1 and B2, while the right-side areas correspond to the areas D2 and C1.

Figure 11:
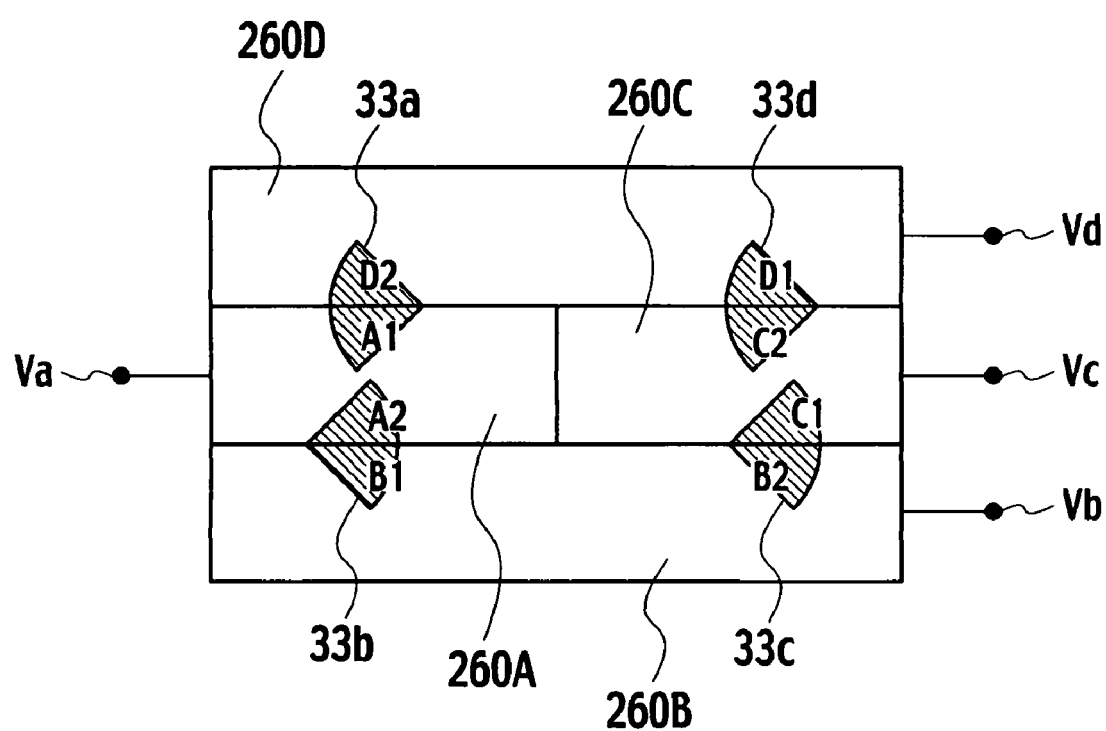
FIG. 11 is a view showing a constitution of a photo detective element of FIG. 9 and configurations of detective spots in focus.

The photo detective element 26 comprises, in view from the hologram element 21, four divided detective parts 260A, 260B, 260C and 260D in the form of substantial oblongs (in plan view) whose longitudinal directions coincide with the direction X (i.e. the radial direction of the optical disc) of the hologram element 21, as shown in FIG. 11. In the direction Y (i.e. the track direction of the optical disc), the photo detective element 26 is also divided into three parts where the divided detective parts 260A, 260C are interposed between the upper divided detective part 260D and the lower divided detective part 260B while opposing the hologram element 21 along the direction X respectively.

Referring to FIG. 10, we now describe four divided areas 30a, 30b, 30c and 30d of the hologram element 21, respectively. In FIG. 10, lights entering the opposing divided areas 30a, 30b are diffracted in the substantial-X direction and further impressed by astigmatism at this diffraction. Consequently, two resultant focal lines due to the astigmatism make 45 degrees with the direction X and the direction Y, respectively. The photo detective element 26 is positioned at a substantially-immediate position between two focal lines produced by the so-diffracted light.

Figure 12:
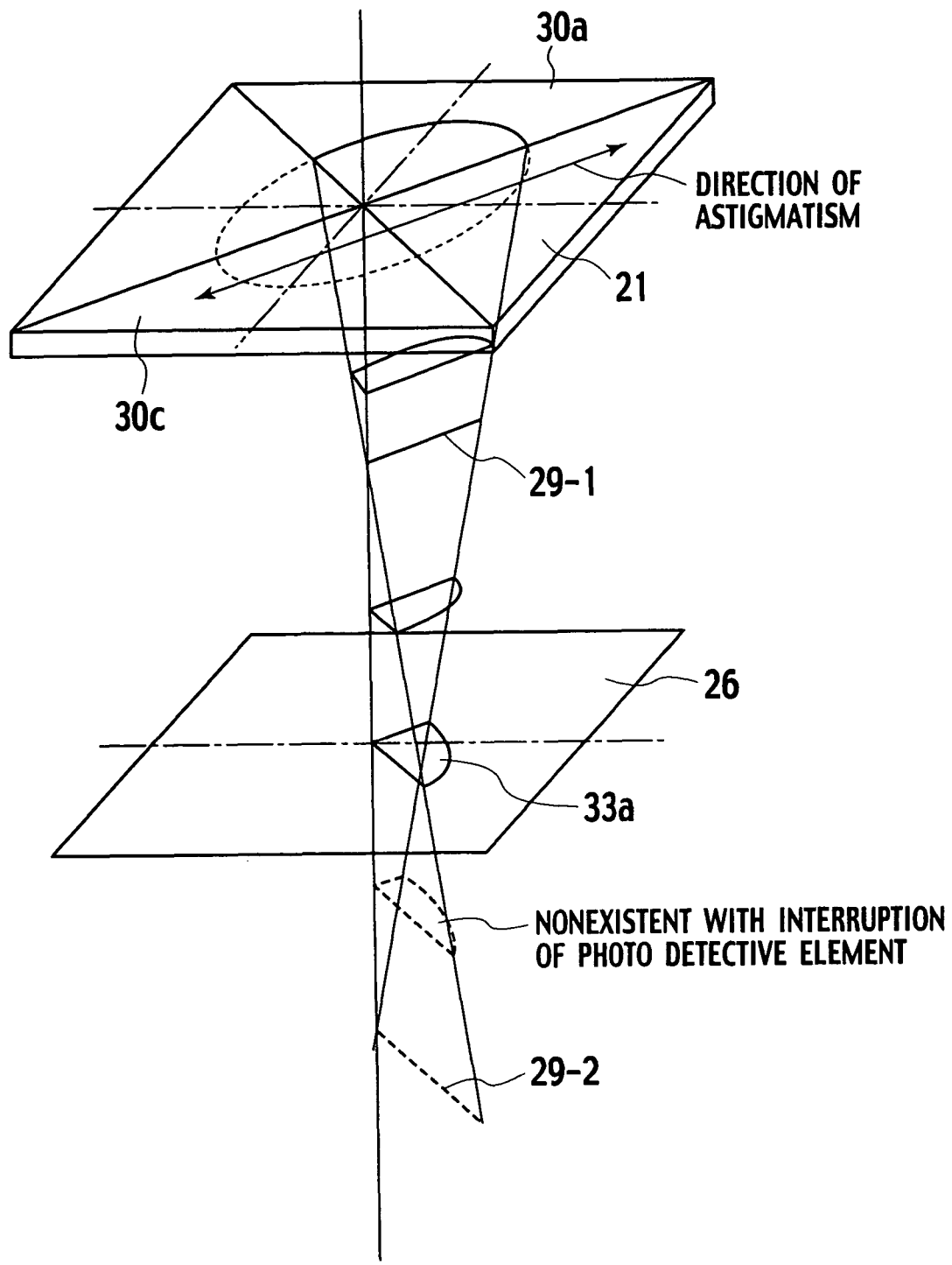
FIG. 12 is a view showing a state where the photo detective element of FIG. 9 is positioned between two focal lines of a diffraction light having its astigmatism applied.

For example, as shown in FIG. 12, the diffraction light diffracted by the divided area 30a of the hologram element 21 produces two focal lines 29-1, 29-2 due to the astigmatism of the hologram element 21. As mentioned above, since the photo detective element 26 is positioned between the focal lines 29-1 and 29-2, the diffraction light diffracted by the area 30 of the hologram element 21 is reversed about an axis in the same direction as the direction of the focal line 29-1, forming a light spot whose configuration is shown with reference numeral 33a of FIGS. 11 and 12, on the photo detective element 26. Similarly, the diffraction light diffracted by the divided area 30c of the hologram element 21 is also reversed about an axis in the same direction as the direction of a focal line, forming a light spot whose configuration is shown with reference numeral 33c of FIG. 11 on the photo detective element 26, the light spot having a shape shown. Note that the other focal line 29-2 is unreal due to light shielding by the photo detective element 26.

On the contrary, the lights entering the other opposing divided areas 30b, 30d (in FIG. 10) of the hologram element 21 are also diffracted in the substantial-X direction and impressed by no astigmatism. Consequently, these diffraction lights form respective light spots having configurations as indicated with reference numerals 33b, 33d of FIG. 11 while maintaining the shapes of the divided areas 30b, 30d of FIG. 10. In connection, it should be noted that although FIG. 9 illustrates the photo detective element 26 receiving the light spots 26a, 26b, the former light spot 26a is identical to the above light spot 33c (or 33d), while the latter light spot 26b corresponds to the above light spot 33b (or 33a).

Figure 13:
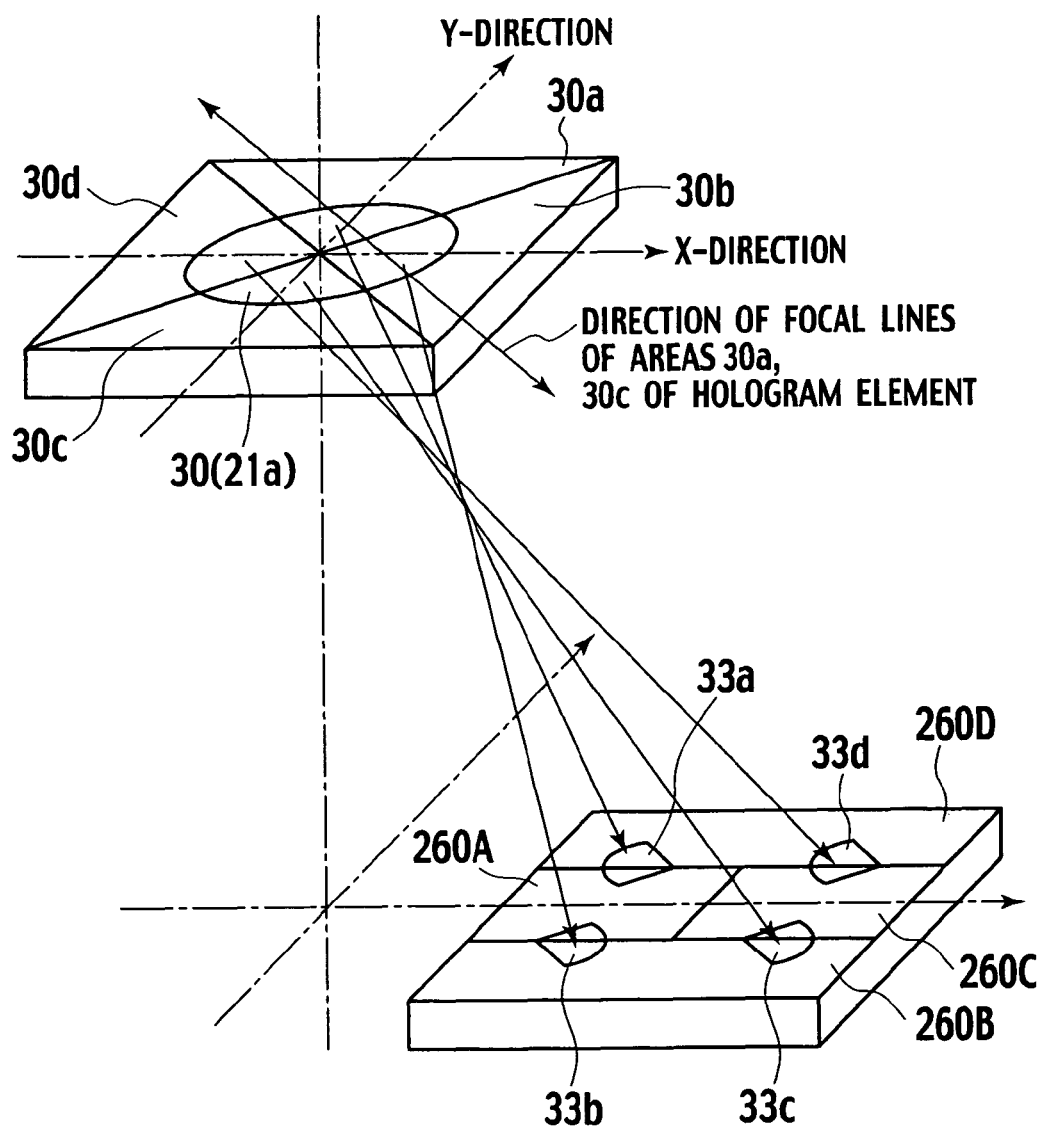
FIG. 13 is a view showing a state that diffraction lights diffracted by two divided areas of the hologram element of FIG. 9 are received by respective divided detective parts of the photo detective element.

FIG. 13 shows a state where the diffraction lights diffracted by the divided areas 30a~30d of the hologram element 21 are respectively received by the divided detective parts 260A~260D. As shown in FIG. 11, the hologram element 21 has the divided detective parts 260A~260D arranged so as to divide each of the light spots 33a, 33b, 33c and 33d in two by parting lines having a direction substantially identical to the direction X. Therefore, as shown in FIGS. 11 and 13, the divided detective part 260A is subjected to an entrance of the diffraction lights through the areas A1 and A2 of the hologram element 21; the divided detective part 260B an entrance of the diffraction lights through the areas B1 and B2; the divided detective part 260C an entrance of the diffraction lights through the areas C1 and C2; and the divided detective part 260D is subjected to an entrance of the diffraction lights through the areas D1 and D2 of the hologram element 21.

Next, we describe an operation to detect a focus error signal in accordance with this embodiment of the invention. Now, we refer a situation where a relative distance (positioning) between the objective lens 23 and the optical disc 24 is established so that the lights converged by the objective lens 23 just focalize on the optical disc 24, as "the relative distance is in the in-focus position". Assume that if the relative distance (positioning) between the objective lens 23 and the optical disc 24 is in the in-focus position, then respective light spots are formed on the divided detective parts 260A~260D, as shown in FIG. 11.

Figure 14:
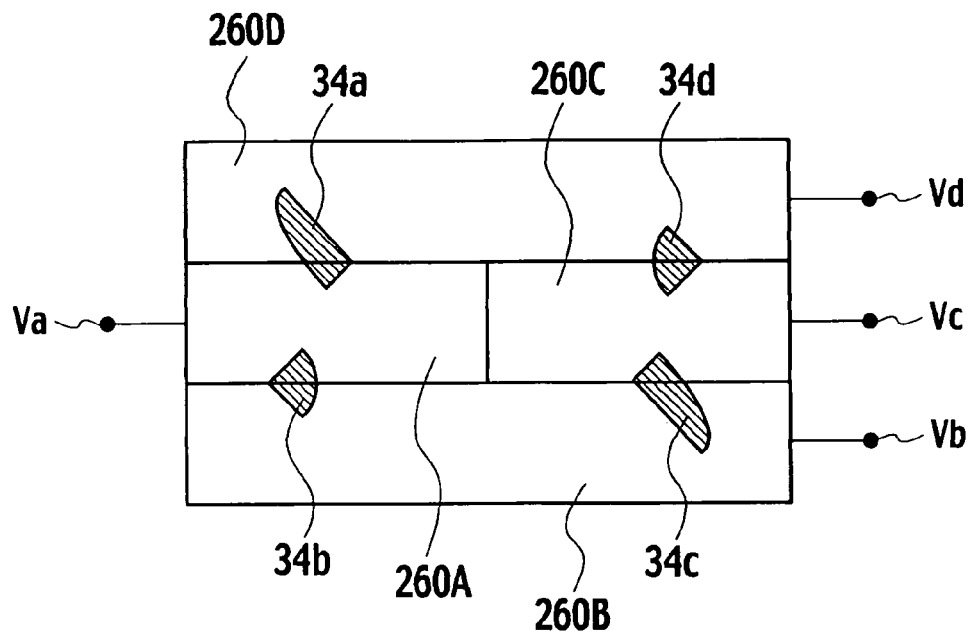
FIG. 14 is a view showing the constitution of the photo detective element of FIG. 9 and first configurations of detective spots when a relative distance between an objective lens and an optical disc of FIG. 9 changes in relation to an in-focus position.
Figure 15:
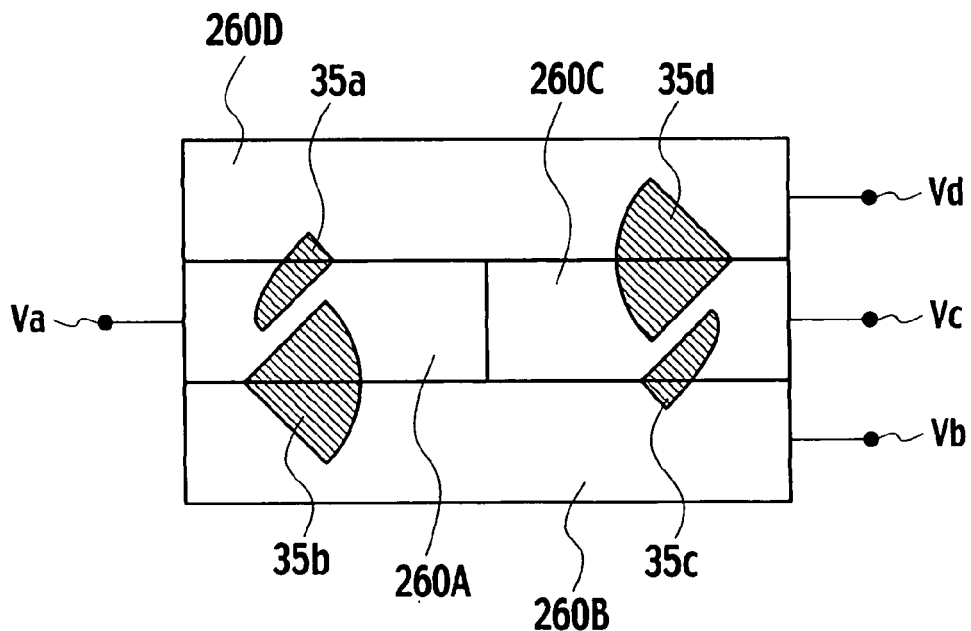
FIG. 15 is a view showing the constitution of the photo detective element of FIG. 9 and second configurations of the detective spots when the relative distance between the objective lens and the optical disc of FIG. 9 changes in relation to the in-focus position.

Repeatedly, the diffraction lights diffracted by the divided areas 30a and 30c of the hologram element 21 are impressed by astigmatism. Therefore, if the relative distance between the objective lens 23 and the optical disc 24 changes with respect to the in-focus position, the light spots formed on the divided detective parts 260A~260D of the photo detective element 26 change along the direction of the parting line 32 (or 31) corresponding to a direction of the change in the relative distance (i.e. increasing or decreasing), as shown with reference numerals 34a and 34c of FIG. 14 or reference numerals 35a and 25c of FIG. 15. Assume that respective output signals from the respective divided detective parts 260A, 260B, 260C and 260D shown in FIGS. 11, 14 and 15 are represented by Va, Vb, Vc and Vd, respectively. Suppose that if the light spots in the in-focus position are represented as shown in FIG. 11, then there is obtained a calculation result of zero (0) by substituting the signals Va~Vd into the expression (Va+Vc)−(Vb+Vd).

On this assumption, it is noted that the situation (pattern of outputs) of FIG. 14 brings a negative value in the calculation of the above expression, while the situation (pattern of outputs) of FIG. 15 brings a positive value in the calculation. In this way, it is possible to detect a focus error signal in accordance with a spot-size method base on the above expression. It will be understood that this calculation method for obtaining the focus error signal is identical to the astigmatism method mentioned before.

Figure 1:
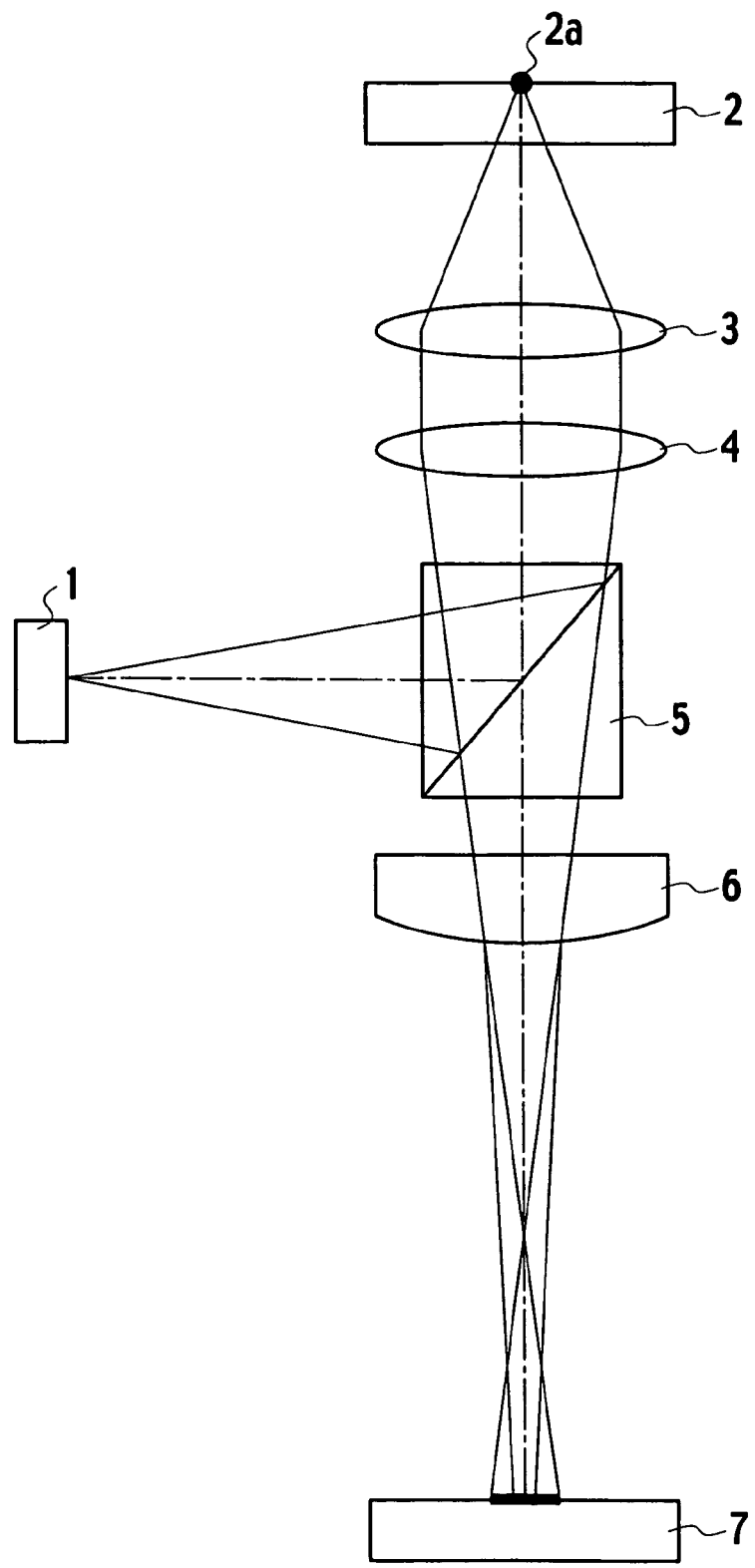
FIG. 1 is a structural view showing one example of a conventional optical pickup device.
Figure 2A:
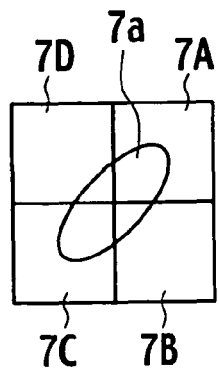
FIGS. 2A, 2B and 2C are views showing first detective areas of a photo detective element of the optical pickup device of FIG. 1.
Figure 2B:
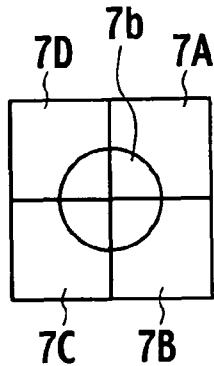
Figure 2C:
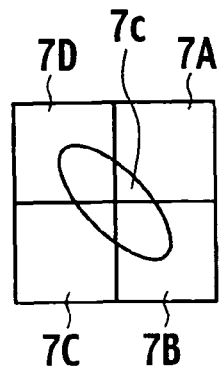
Figure 3A:
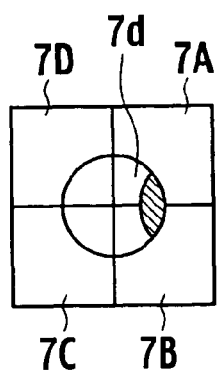
FIGS. 3A, 3B and 3C are views showing second detective areas of the photo detective element of the optical pickup device of FIG. 1.
Figure 3B:
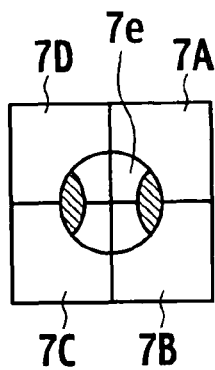
Figure 3C:
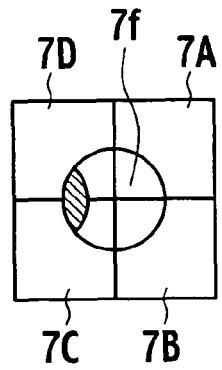
Figure 4A:
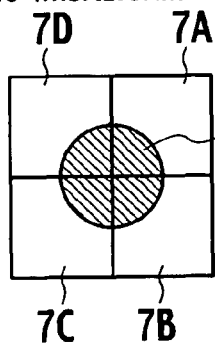
FIGS. 4A and 4B are views showing respective positions of detective spots corresponding to tracking deviations of the photo detective element of the conventional optical pickup device.
Figure 4B:
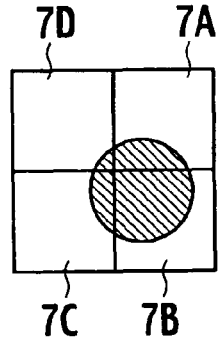
Figure 5:
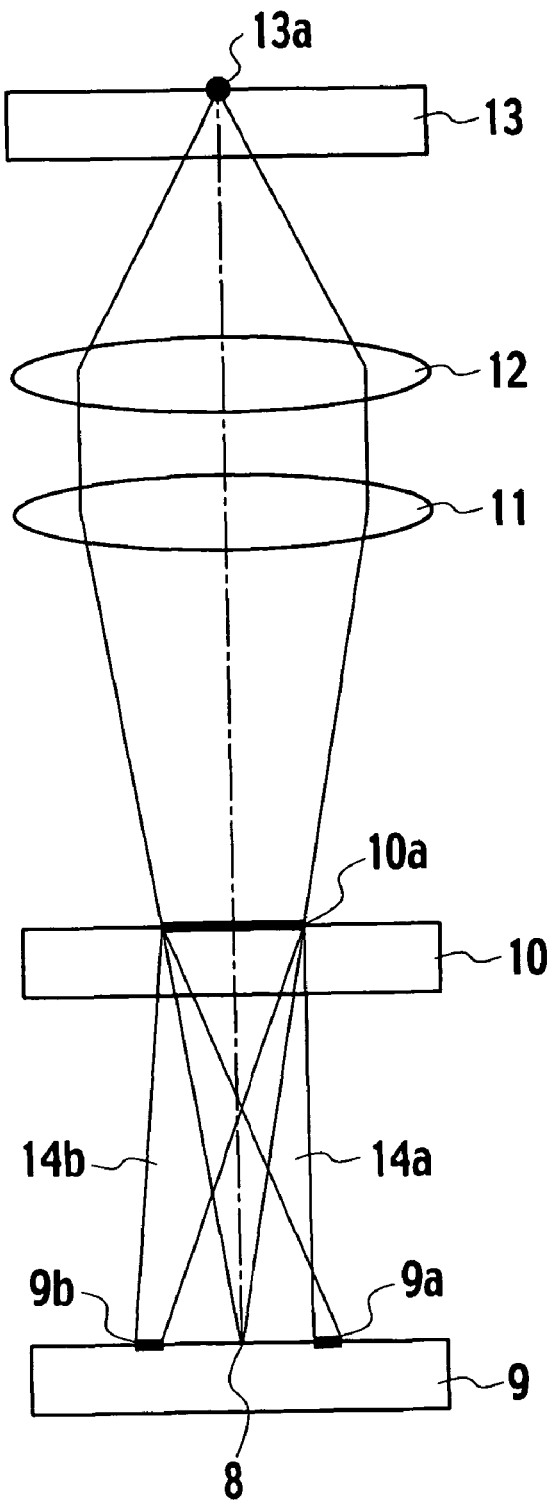
FIG. 5 is a structural view showing another example of the conventional optical pickup device.
Figure 6A:
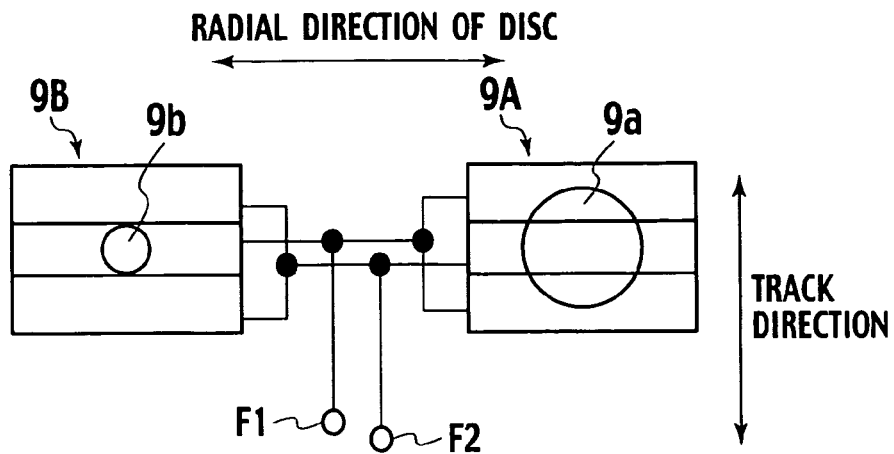
FIGS. 6A, 6B and 6C are views showing a constitution of a photo detective element of the optical pickup device of FIG. 5 and detective areas of the photo detective element.
Figure 6B:
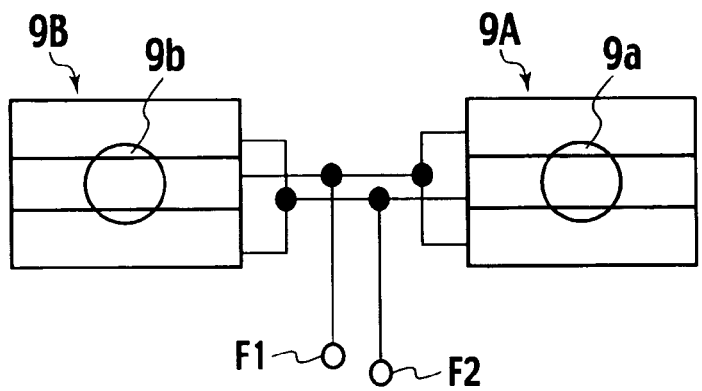
Figure 6C:
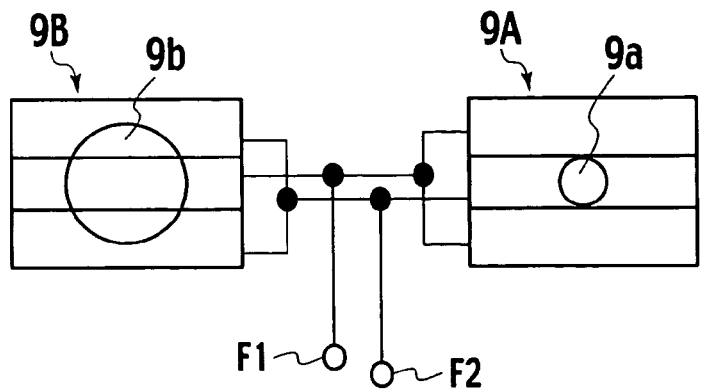

Next, we describe an operation to detect a tracking error signal in accordance with this embodiment of the invention. It is noted that incident light entering the circular area 30 (FIG. 10) through which the reflection light of the light spot 24a in the optical disc 24 is transmitted in the hologram element 21 represents an optical-power distribution in the objective lens 23, similarly to the light spot formed on the photo detective element in case of the astigmatism method. In this embodiment, accordingly, respective areas (A1+A2), (B1+B2), (C1+C2) and (D1+D2) of FIG. 10 coincide with four divided detective parts (7A, 7B, 7C and 7D of FIGS. 2A~2C) of the photo detective element 7 in the conventional optical pickup device in accordance with the astigmatism method shown in FIG. 1, respectively.

The diffraction lights in the respective areas enter the divided detective parts 260A~260D of FIG. 11, as mentioned before. Thus, by substituting the output signals Va~Vd from the divided detective parts 260A~260D into the expression (Va+Vb)−(Vc+Vd) in the same manner as the astigmatism method, it is possible to detect a tracking error signal in accordance with the push-pull method. Also in the phase-difference method, it is possible to detect a tracking error signal by comparing a phase of (Va+Vc) with a phase of (Vb+Vd), which is similar to the astigmatism method.

Thus, according to this embodiment, owing to the adoption of an error-signal detection method using the hologram element 21, it is possible to realize high reliability, which is equal to that of an optical pickup using a hologram element in accordance with the spot-size method, and miniaturization and also possible to detect servo-error signals (focus error signal, tracking error signal) with the use of an electric-signal calculating circuit identical to that in the astigmatism method. Note that in order to detect information recorded in the optical disc 24, it is required to only calculate the summation of respective output signals from the divided detective parts 260A~260D, that is, (Va+Vb+Vc+Vd).

The above explanation is based on the premise that the lights entering the divided areas 30a and 30c of the hologram element 21 (FIG. 10) containing a direction identical to the track direction are diffracted to the substantial-X direction (i.e. a direction making a right angle with the track direction Y). However, this characteristic of the divided areas 30a and 30c of the hologram element 21 may be modified so as to diffract incident lights in the range of approx. 90 degrees±20 degrees to the track direction Y. Additionally, the other divided areas 30b and 30d of the hologram element 21, which do not contain a direction identical to the track direction, may be characterized by diffracting incident lights in the range of approx. 90 degrees±20 degrees to the track direction Y as well.

2$^{nd}$. Embodiment

The second embodiment of the present invention is basically similar to the first embodiment shown in FIG. 9. In the second embodiment, however, astigmatism is further impressed on incident lights entering the divided areas 30b and 30d of the hologram element 21, different from the first embodiment. Then, two focal lines produced by so-impressed astigmatism are characterized by their directions equal to the substantial-X direction and the substantial-Y direction.

Figure 16:
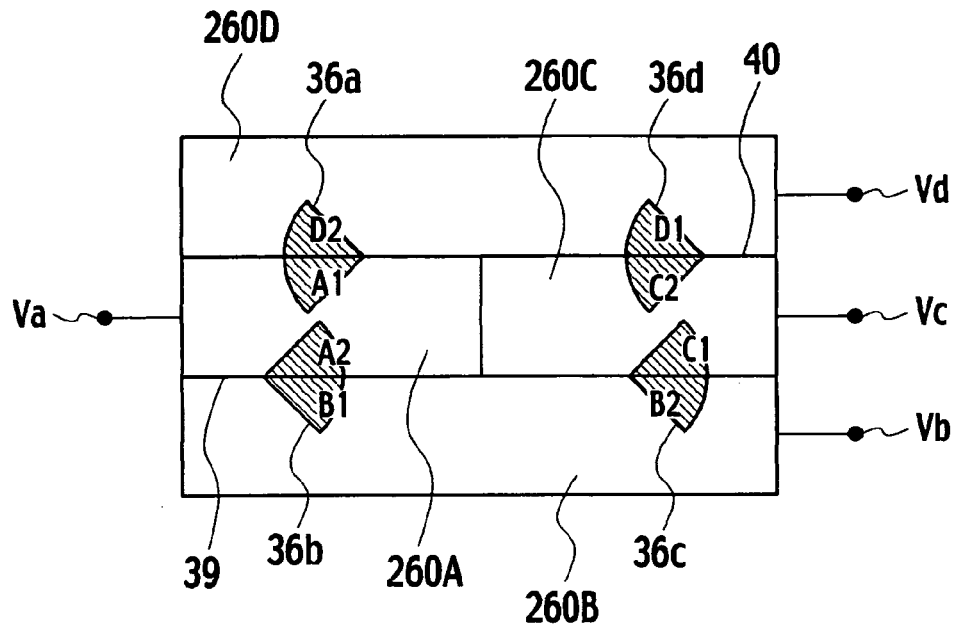
FIG. 16 is a view showing the constitution of the photo detective element of the second embodiment of the present invention and configurations of detective spots in focus.

Consequently, in the in-focus position where the relative distance between the objective lens 23 and the optical disc 24 is established so that the lights converged by the objective lens 23 just focalize on the optical disc 24, the light spots formed on the divided detective parts 260A~260D forming the photo detective element 26 have configurations shown with reference numerals 36a~36d of FIG. 16. If the relative distance between the objective lens 23 and the optical disc 24 changes out of the in-focus position, then the configurations of the lights spots change as shown with reference numerals 37a~37d of FIG. 17 or reference numerals 38a~38d of FIG. 18.

It will be understood from these figures that, in the in-focus position, the light spots formed on the divided detective parts 260A~260D of the photo detective element 26 represent the light spots 36a~36d of FIG. 16 whose configurations are identical to those of the first embodiment shown in FIG. 11. In connection, even if they are not in the in-focus position, the light spots 37a, 37c of FIG. 17 have the same configuration as those of the light spots 34a, 34c of FIG. 14 respectively and furthermore, the light spots 38a, 38c of FIG. 18 have the same configuration as those of the light spots 35a, 35c of FIG. 15 respectively.

According to the embodiment, however, since the astigmatism is also impressed on the lights entering the divided areas 30b, 30d (FIG. 10) of the hologram element 21, the diffraction lights diffracted by the same areas 30b, 30d reverse about an axis in the same direction as the focal line due to the astigmatism impressed by the hologram element 21. As a result, if the objective lens 23 and the optical disc 24 are not in the in-focus position, then the resulting light spots on the photo detective element 26 represent either configurations shown with reference numerals 37b, 37d of FIG. 17, which are different from those of the light spots 34b, 34d of FIG. 14 under no astigmatism, or configurations shown with reference numerals 38b, 38d of FIG. 18, which are different from those of the light spots 35b, 35d of FIG. 15 under no astigmatism.

Figure 17:
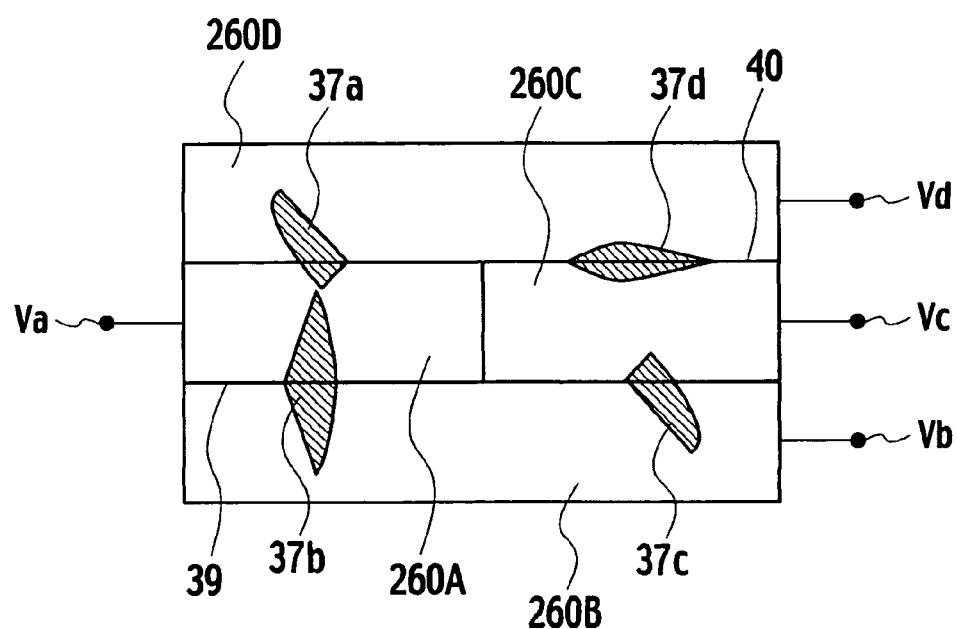
FIG. 17 is a view showing the constitution of the photo detective element of the second embodiment of the present invention and first configurations of detective spots when a relative distance between an objective lens and an optical disc changes in relation to an in-focus position.
Figure 18:
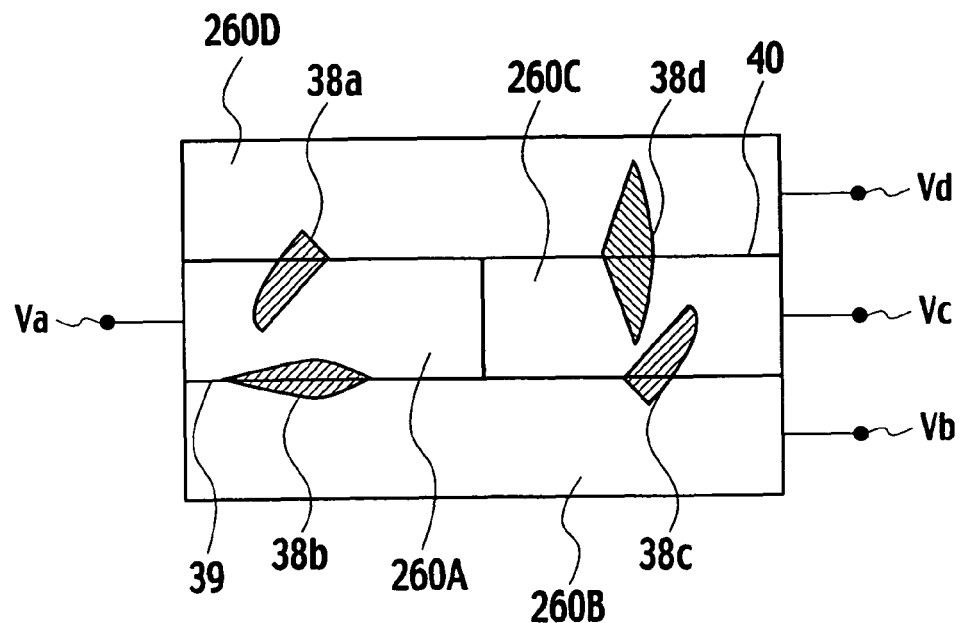
FIG. 18 is a view showing the constitution of the photo detective element of the second embodiment of the present invention and second configurations of the detective spots when the relative distance between the objective lens and the optical disc changes in relation to the in-focus position.

In the embodiment, however, as any one of the light spots 37b, 37d, 38b and 38d of FIGS. 17 and 18 transforms its configuration in axial-symmetry with a border line (parting line) 39 between the divided detective part 260A and the divided detective part 260B or a border line (parting line) 40 between the divided detective part 260C and the divided detective part 260D, there is no influence on the focus error signal.

3$^{rd}$. Embodiment

According to the third embodiment of the invention, four divided areas 30a~30d of the hologram element 21 are characterized by diffracting the light reflected on the photo disc and further impressing astigmatism on the diffraction lights, similarly to the second embodiment of the invention. Different from the second embodiment, however, the photo detective element 26 is composed of ten divided detective parts 261A~261J, as shown in FIGS. 19~21.

Figure 19:
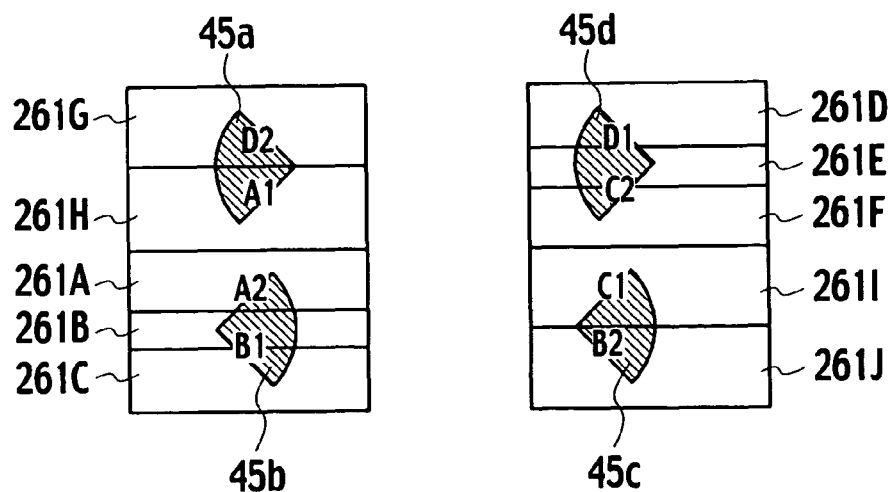
FIG. 19 is a view showing the constitution of the photo detective element of the third embodiment of the present invention and configurations of detective spots in focus.
Figure 20:
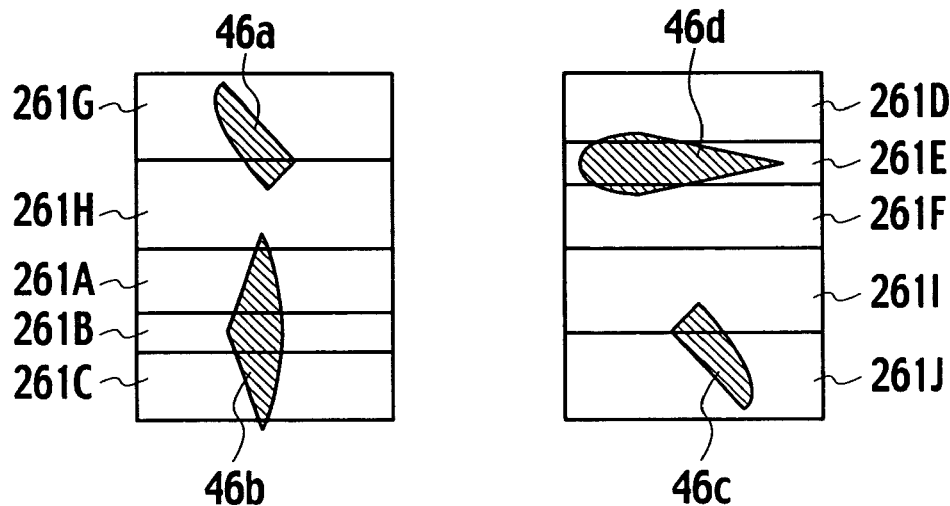
FIG. 20 is a view showing the constitution of the photo detective element of the third embodiment of the present invention and first configurations of detective spots when a relative distance between an objective lens and an optical disc changes in relation to the in-focus position.
Figure 21:
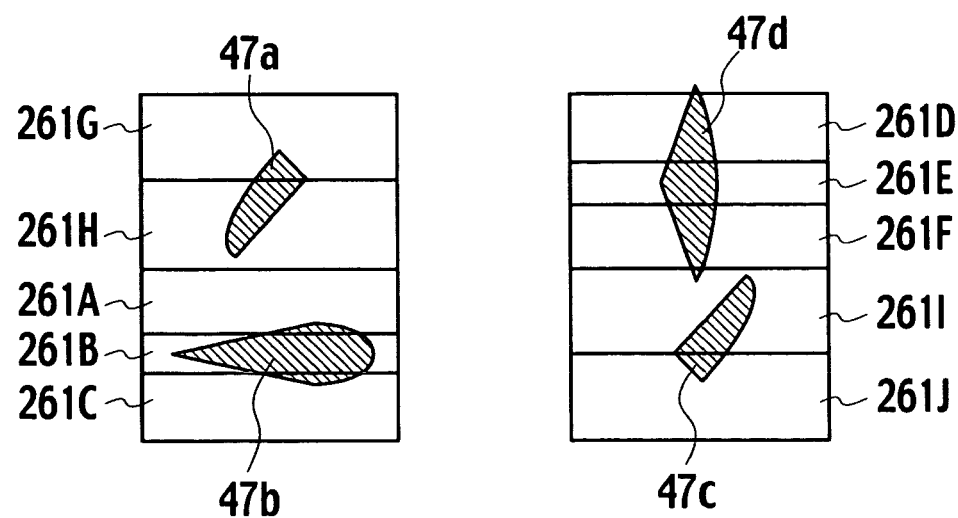
FIG. 21 is a view showing the constitution of the photo detective element of the third embodiment of the present invention and second configurations of the detective spots when the relative distance between the objective lens and the optical disc changes in relation to the in-focus position.

In detail, as shown in FIGS. 19~21, the photo detective element 26 comprises three divided detective parts 261A, 261B and 261C receiving the diffraction light from the divided area 30b of the hologram element 21 shown in FIG. 10, three divided detective parts 261D, 261E and 261F receiving the diffraction light from the divided area 30d, two divided detective parts 261G and 261H receiving the diffraction light from the divided area 30a and two divided detective parts 261I and 261J receiving the diffraction light from the divided area 30c.

When the relative position (distance) between the objective lens 23 and the optical disc 24 is in the in-focus position, the diffraction lights from the areas A2, B1 (FIG. 10) of the hologram element 21 enter the divided detective parts 261A, 261B and 261C to form a light spot 45b, while the diffraction lights from the areas D1, C2 of the hologram element 21 enter the divided detective parts 261D, 261E and 261F to form a light spot 45d. Additionally, the diffraction lights from the areas D2, A1 of the hologram element 21 enter the divided detective parts 261G and 261H to form a light spot 45a, while the diffraction lights from the areas B2, C1 of the hologram element 21 enter the divided detective parts 261I and 261J to form a light spot 45c.

If the relative distance between the objective lens 23 and the optical disc 24 changes from the in-focus position, there are formed, on the photo detective element 26, either the light spots 46a~46d or the light spots 47a~47d each having different configurations from those in the in-focus position due to the astigmatism of the divided areas 30a~30d (FIG. 10) of the hologram element 21, as shown in FIG. 20 or 21.

In detail, the diffraction lights from the above areas A2 and B1 entering the divided detective parts 261A, 261B and 261C form either the light spot 46b in FIG. 20 or the light spot 47b in FIG. 21; the diffraction lights from the above areas D1 and C2 entering the divided detective parts 261D, 261E and 261F form either the light spot 46d in FIG. 20 or the light spot 47d in FIG. 21; the diffraction lights from the above areas D2 and A1 entering the divided detective parts 261G and 261H form either the light spot 46a in FIG. 20 or the light spot 47a in FIG. 21; and the diffraction lights from the above areas B2 and C1 entering the divided detective parts 261I and 261J form either the light spot 46c in FIG. 20 or the light spot 47c in FIG. 21.

Assume that respective output signals from the divided detective parts 261A~261J are represented by V1a~V1j, respectively. Then, the focus error signal in accordance with the astigmatism method can be obtained by the calculation of the expression $(V1g+V1j)-(V1h+V1i)$. While, the focus error signal in accordance with the spot-size method can be obtained by the calculation of the expression $(V1a+V1c+V1e)-(V1b+V1d+V1f)$. The focus error signal in accordance with the push-pull method can be obtained by a calculation of $(V1a+V1b+V1c+V1h+V1j)-(V1d+V1e+V1f+V1g+V1i)$.

Additionally, the information recorded in the optical disc can be obtained by combining respective output signals from all of the divided detective parts 261A~261J in addition.

According to the embodiment, it is possible to obtain the similar focus error signals by the astigmatism method and the spot-size method simultaneously. Thus, the photo pickup device of this embodiment has an advantage of the possibility of connecting with any electric circuit irrespective of difference in computing type (the astigmatism method or the spot-size method).

4th. Embodiment

Figure 22:
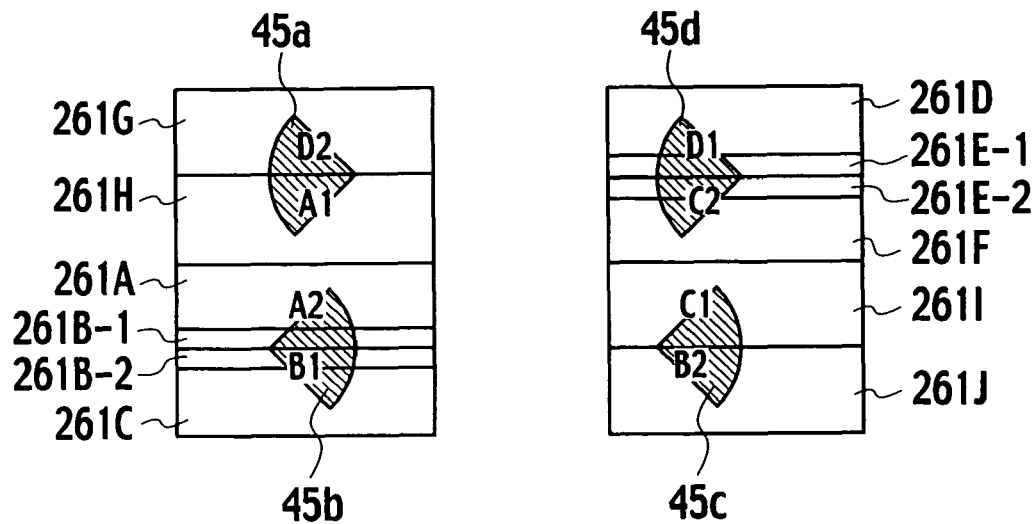
FIG. 22 is a view showing the constitution of the photo detective element of the fourth embodiment of the present invention and configurations of detective spots in focus.
Figure 23:
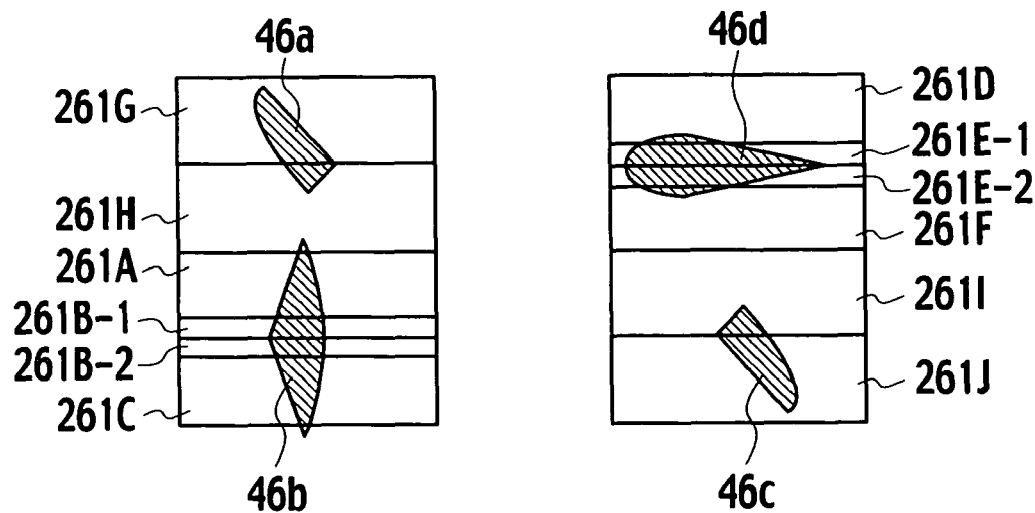
FIG. 23 is a view showing the constitution of the photo detective element of the fourth embodiment of the present invention and first configurations of detective spots when a relative distance between an objective lens and an optical disc changes in relation to the in-focus position.
Figure 24:
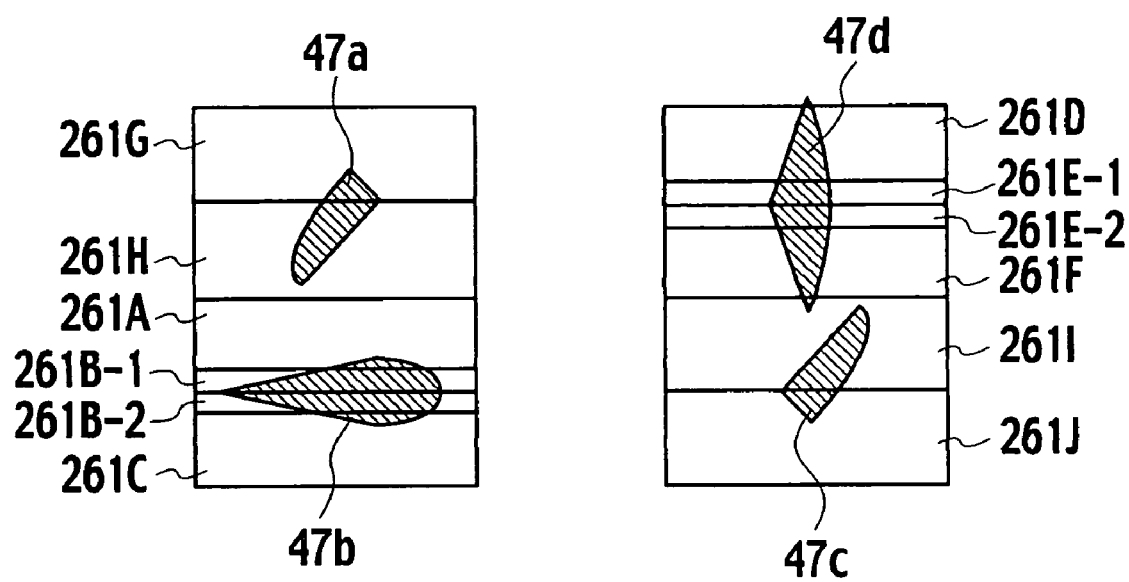
FIG. 24 is a view showing the constitution of the photo detective element of the fourth embodiment of the present invention and second configurations of the detective spots when the relative distance between the objective lens and the optical disc changes in relation to the in-focus position.

FIGS. 22~24 show various relationships between a photo detective element, which constitutes a substantial part of the optical pickup device in accordance with the fourth embodiment of the present invention, and various light spots formed on the photo detective element. In FIGS. 22~24, constituents identical to those of FIGS. 19~21 are indicated with the same reference numerals respectively and their descriptions are eliminated. Similarly to the third embodiment, four divided areas 30a~30d of the hologram element 21 are characterized by diffracting the reflection light from the photo disc and further impressing astigmatism on the diffraction light respectively. Additionally, the constitution of the photo detective element is similar to that of the third embodiment. According to the embodiment, however, the divided detective parts 261B, 261E of FIGS. 19~21 are further divided in half respectively, that is, parts 261B-1, 261B-2 (261B) and parts 261E-1, 261E-2 (261E).

FIG. 22 shows a relationship between the divided detective parts and the light slots when the relative position between the objective lens 23 (FIG. 9) and the optical disc 24 is in the in-focus position. While, FIGS. 23 and 24 show respective relationships between the divided detective parts and the light spots when the relative distance between the objective lens 23 and the optical disc 24 changes out of the in-focus position, corresponding to the change (increasing or decreasing).

Although the detecting method of the tracking error signal corresponds to the push-pull method in the third embodiment mentioned above, it is necessary to adopt the phase-difference method for DVD. In the phase-difference method, it is required to compare a phase of an output signal corresponding to the area (A1+A2)+(C1+C2) of the hologram element 21 (FIG. 10) with a phase of another output signal corresponding to the area (B1+B2)+(D1+D2). In the third embodiment, however, it is impossible to obtain the tracking error signal by the phase-difference method because the photo detective element of the embodiment is not divided so as to allow the light spots 45b, 45d (FIG. 19), which are formed on the divided detective parts by the diffraction lights of the divided areas 30b, 30d (FIG. 10) of the hologram element 21, to be outputted while being divided into the areas A2 and B1 and the areas D1 and C2 of the hologram element 21.

In order to allow the divided detective part for receiving the light spot 45b to output signals corresponding to the areas A2 and B1 separately, according to the fourth embodiment, the divided detective part 261B for receiving the light spot 45b is divided into two parts 261B-1 and 261B-2 and additionally, the divided detective part 261E for receiving the light spot 45d is also divided into two parts 261E-1 and 261E-2, as shown in FIG. 22, allowing the tracking error signal to be detected by the phase-difference method. Note that if the relative distance between the objective lens 23 and the optical disc 24 changes from that in the in-focus position, the divided detective parts 261B-1 and 261B-2 receive the light spot 46b of FIG. 23 and the light spot 47b of FIG. 24, while the divided detective parts 261E-1 and 261E-2 receive the light spot 46d of FIG. 23 and the light spot 47d of FIG. 24.

Assume that in this embodiment respective output signals from the divided detective parts 261B-1, 261B-2, 261E-1 and 261E-2 of FIGS. 22~24 are represented by V1b1, V1b2, V1e1 and V1e2, respectively. Then, the focus error signal in accordance with the astigmatism method can be obtained by the calculation of the expression (V1g+V1j)−(V1h+V1i). While, the focus error signal in accordance with the spot-size method can be obtained by the calculation of the expression (V1a+V1c+V1e1+V1e2)−(V1b1+V1b2+V1d+V1f).

Additionally, the focus error signal in accordance with the push-pull method can be obtained by the calculation of the expression (V1a+V1b1+V1b2+V1c+V1h+V1j)−(V1d+V1e1+V1e2+V1f+V1g+V1i). The tracking error signal in accordance with the phase-difference method can be obtained by comparing both phases of (V1h+V1a+V1b1)+(V1i+V1f+V1e2) and (V1j+V1c+V1b2)+(V1g+V1d+V1e1) with each other. Additionally, the information recorded in the optical disc can be obtained by combining respective output signals from all of the divided detective parts shown in FIGS. 22, 23 and 24 in addition.

According to the embodiment, it is possible to obtain the similar focus error signals by the astigmatism method and the spot-size method simultaneously. Thus, the photo pickup device of this embodiment is capable of connecting with any electric circuit irrespective of difference in computing type (the astigmatism method or the spot-size method) and further coping with a situation requiring the tracking error signal by the phase-difference method, such as DVD.

5th. Embodiment

Figure 25:
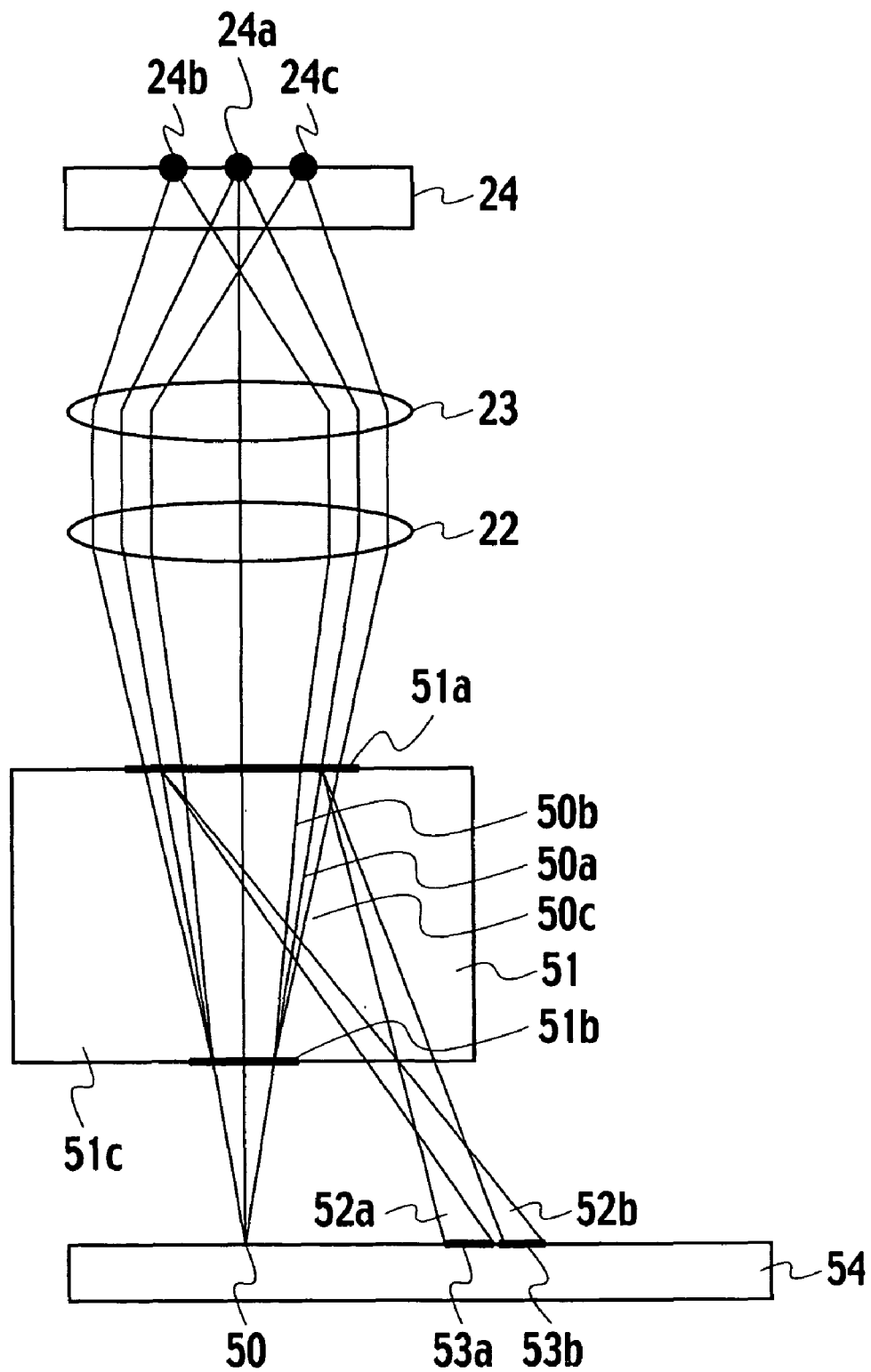
FIG. 25 is a structural view of an optical pickup device in accordance with a fifth embodiment of the present invention.

FIG. 25 is a structural view of the optical pickup device in accordance with the fifth embodiment of the present invention. In the figures, constituents identical to those of FIG. 9 are indicated with the same reference numerals respectively. In FIG. 25, light radiated from a semiconductor laser 50 as the light source enters a hologram element 51. The hologram element 51 includes an element body 51c in the form of a cuboid of a predetermined thickness, which is made of optically-transparent resin or glass. The element body 51 includes a hologram part 51a formed on one surface opposing the optical disc 24 and a diffraction grating part 51b formed on the other surface opposing the photo detective element 54.

The light radiated from the semiconductor laser 50 enters the diffraction grating part 51b of the hologram element 51 and is divided into a non-diffraction light 50a and two diffraction lights 50b, 50c by the diffraction grating part 51b. This division is performed to generate a sub-beam for detecting the tracking error signal on the side of the optical disc 24, which will be mentioned later. The non-diffraction light 50a and the diffraction lights 50b and 50c all radiated from the diffraction grating part 51b are transmitted through the hologram part 51a formed on the other surface of the hologram element 51 on the opposite side of the diffraction grating part 51b and further transmitted through the collimator lens 22 and the objective lens 23, in order. Then, these lights are converged by the objective lens 23 to form three light spots 24a, 24b and 24c on the optical disc 24.

It is noted that the non-diffraction light 50a and the diffraction lights 50b, 50c radiated from the diffraction grating part 51b are further radiated from the hologram part 51a while being each divided into non-diffraction and diffraction lights. However, since the light diffracted by the hologram part 51a is radiated outside the collimator lens 22 for unusable light, it is not shown in the figure.

The light spots 24a, 24b and 24c of FIG. 25 are reflected by the optical disc 24 and subsequently transmitted to the hologram part 51a of the hologram element 51 through the objective lens 23 and the collimator lens 22, in this order. The reflection light originating in the light spot 24a on the photo disc 24 and entering the hologram part 51a of the hologram element 51 is diffracted to radiate diffraction lights 52a, 52b. The diffraction lights 52a, 52b enter the photo detective element 54 to form light spots 53a, 53b thereon.

Figure 26:
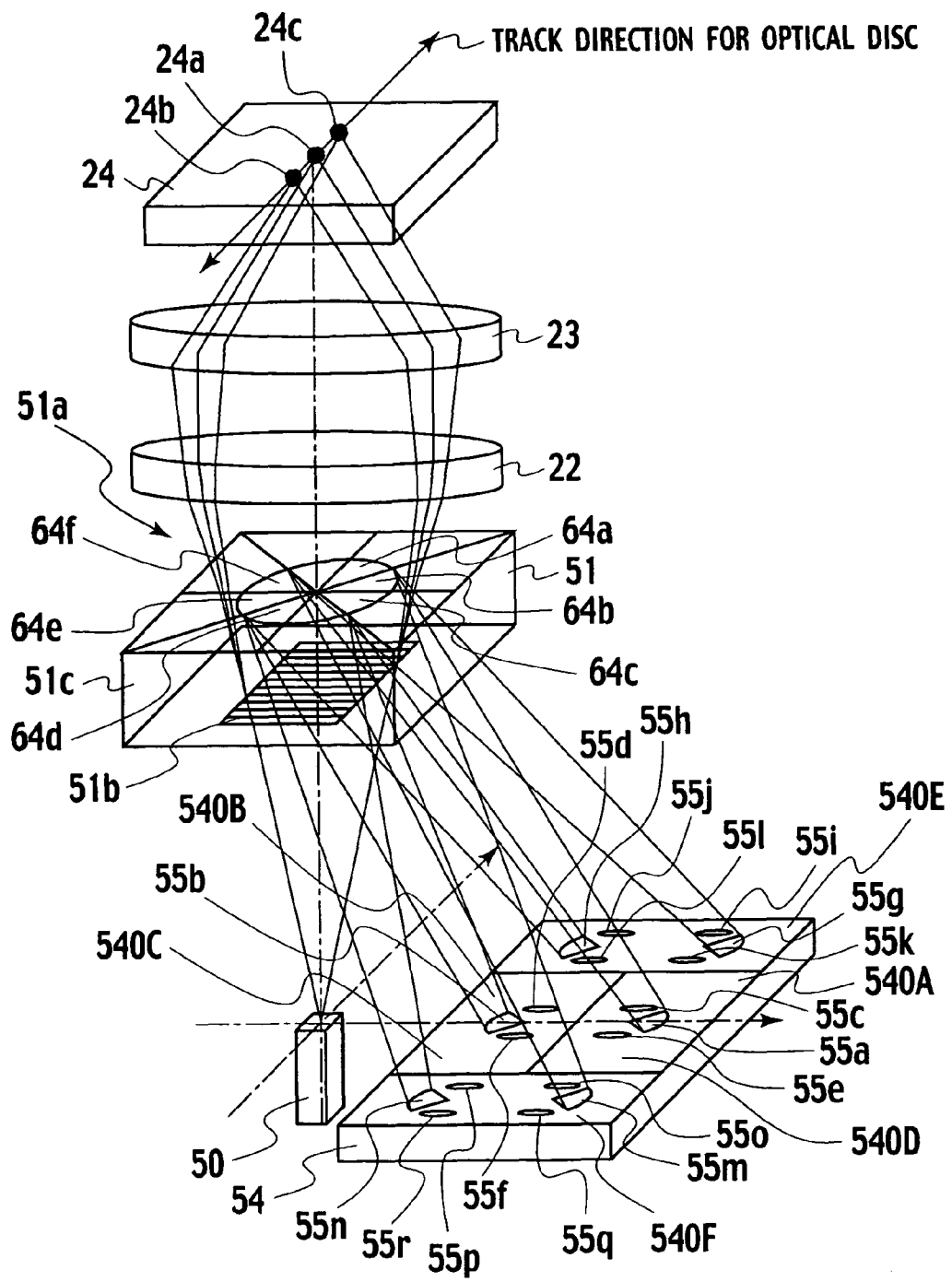
FIG. 26 is a schematic perspective view showing a constitution of the optical pickup device in accordance with the fifth embodiment of the present invention.

Note that as the hologram part 51a is divided into six areas of different optical characteristics (mentioned later, in detail), six light spots 55a, 55b, 55c, 55d, 55e and 55f are actually formed on an detective surface of the photo detective element 24 by the reflection light of the light spots 24b on the optical disc 24, as shown in FIG. 26. On the detective surface of the photo detective element 24, similarly, there are formed six light spots 55g, 55h, 55i, 55j, 55k and 55l by the reflection light of the light spot 24b on the optical disc 24 and six light spots 55m, 55n, 55o, 55p, 55q and 55r by the reflection light of the light spot 24c, so that a total of eighteen light spots are formed (although some spots are abbreviated in FIG. 25).

Figure 27:
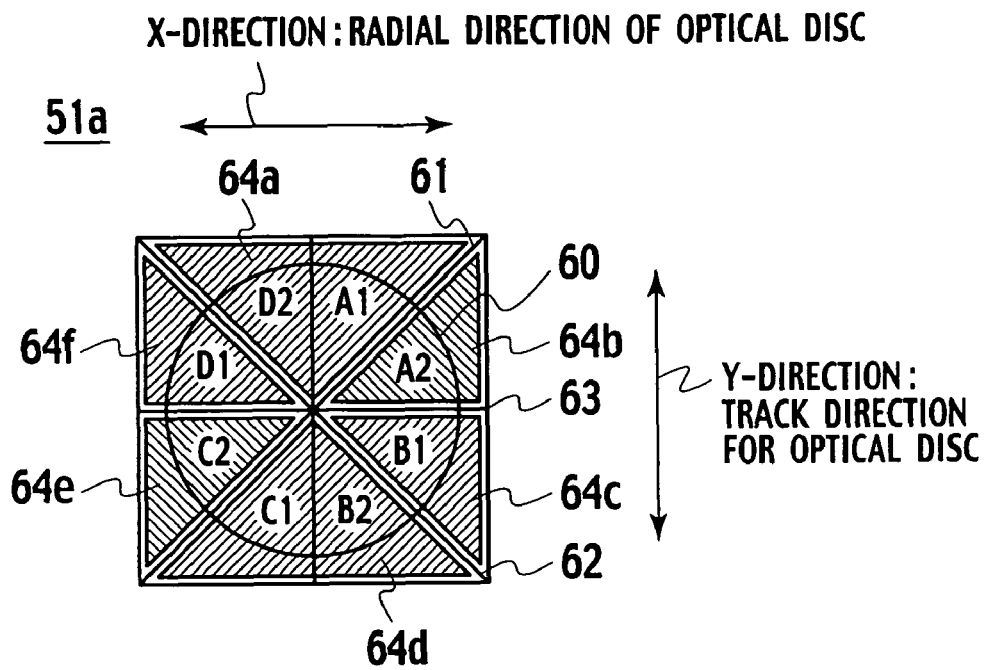
FIG. 27 is a view showing respective areas on a hologram element used in the optical pickup devices in accordance with the fifth and sixth embodiments of the present invention.

The hologram part 51a of the hologram element 51 of FIGS. 25 and 26 looks like FIG. 27, in a view from the collimator lens 22. In FIG. 27, a circular area shown with reference numeral 60 denotes an area of the hologram element 51 through which the reflection lights of the light spots 24a, 24b and 24c on the optical disc 24 are transmitted. Assuming in FIG. 27 that a direction Y represents a direction that is obtained by projecting a track direction of the optical disc 24 on the hologram element 51 and that a direction X represents a direction that is obtained by projecting a radial direction of the optical disc 24 on the hologram element 51, the hologram part 51a of the hologram element 51 is divided into six areas 64a, 64b, 64c, 64d, 64e and 64f (FIG. 27) by two parting lines 61 and 62 making 45 degrees with the directions X and Y and one parting line 63 of the same direction as the direction X. Further, each of the divided areas 64a and 64d is divided into two zones in the direction X. In this way, resulting areas will be referred to as "A1, A2, B1, B2, C1, C2, D1 and D2", as shown in FIG. 27.

In these divided areas, the divided area 64a is identical to an area where a pit recorded in a track of the optical disc and projected on the hologram element 51 goes in. On the other hand, the divided area 64d is identical to an area where the pit goes out. Additionally, on condition that the divided areas 64a and 64d are respectively divided in two on the border of the track (the direction Y) projected on the hologram element 51, the left-side areas (in view of an incoming direction of a pit projected on the hologram element 51) correspond to the areas A1 and B2, while the right-side areas correspond to the areas D2 and C1.

Figure 28:
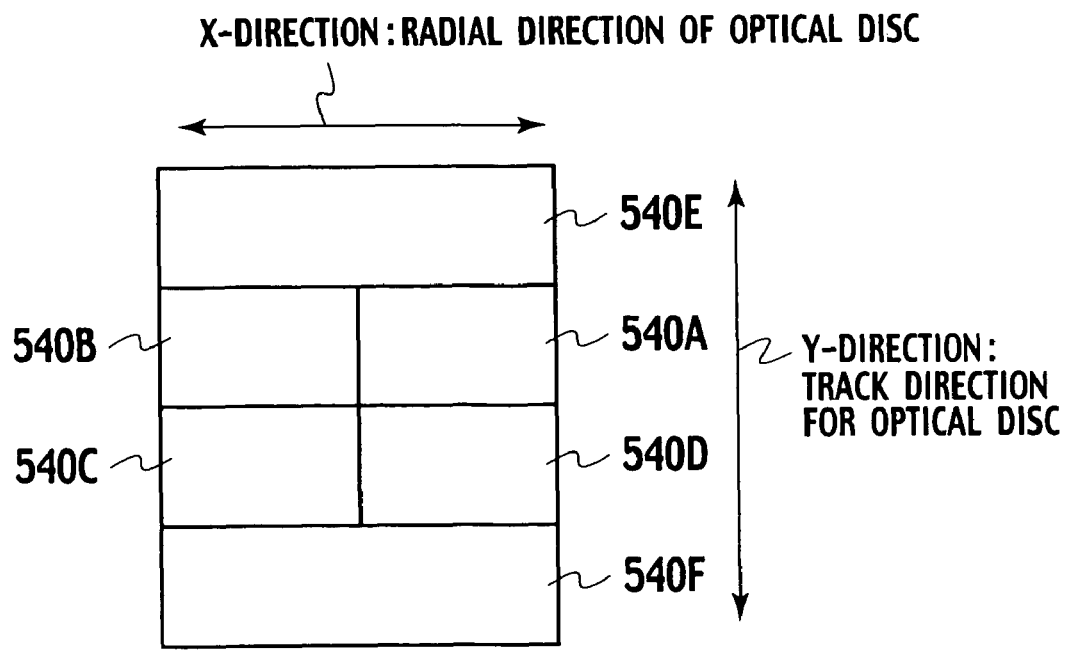
FIG. 28 is a view showing one example of detective areas of a photo detective element in the optical pickup device of FIGS. 25 and 26.

The photo detective element 54 of FIGS. 25 and 26 comprises, in view from the hologram element 51, six divided detective parts 540A, 540B, 540C, 540D, 540E and 540F in the form of substantial oblongs, as shown in FIG. 28. In FIG. 28, the photo detective element 54 is also divided into four parts in the direction Y (i.e. track direction of the optical disc). A photo detective element's part divided in two in the direction Y and interposed between the part 540E and the part 540F is further divided in two in the direction X (i.e. radial direction of the photo disc). Consequently, the divided detective parts 540A and 540B are opposed to each other in the direction X, while the divided detective parts 540D and 540C are also opposed to each other in the direction X.

Referring to FIG. 27, we now describe six divided areas 64a, 64b, 64c, 64d, 64e and 64f of the hologram part 51a, respectively. When the reflection light of the center light spot 24a of the three light spots 24a~24c on the photo disc 24 (FIG. 25) passes through the objective lens 23 and the collimator lens 22 and subsequently enters the hologram part 51a of the hologram 51, the lights entering the divided areas 64a, 64d opposing in the direction Y (FIG. 27) are diffracted in the substantial-X direction and further impressed by astigmatism at this diffraction. Consequently, two resultant focal lines due to the astigmatism make 45 degrees with the direction X and the direction Y, respectively. The photo detective element 54 is positioned at a substantially-immediate position between two focal lines produced by the so-diffracted light.

The above-mentioned positional relationship is similar to that of FIG. 11. There are only arranged the photo detective element 54 of FIG. 25 and the hologram part 51a of FIGS. 25 and 27 in place of the photo detective element 26 and the hologram element 21 of FIG. 12, respectively. For instance, the diffraction light diffracted by the divided area 64a of the hologram part 51a produces two focal lines due to the astigmatism impressed by the same area 64a, while the photo detective element 54 is arranged between these focal lines. Thus, the diffraction light diffracted by the divided area 64a of the hologram part 51a is reversed about an axis in the same direction as the direction of the focal line between the hologram part 51a and the divided area 64a, forming a light spot whose configuration is shown with reference numeral 55a of FIGS. 26, 29 and 30, on the photo detective element 54.

Figure 29:
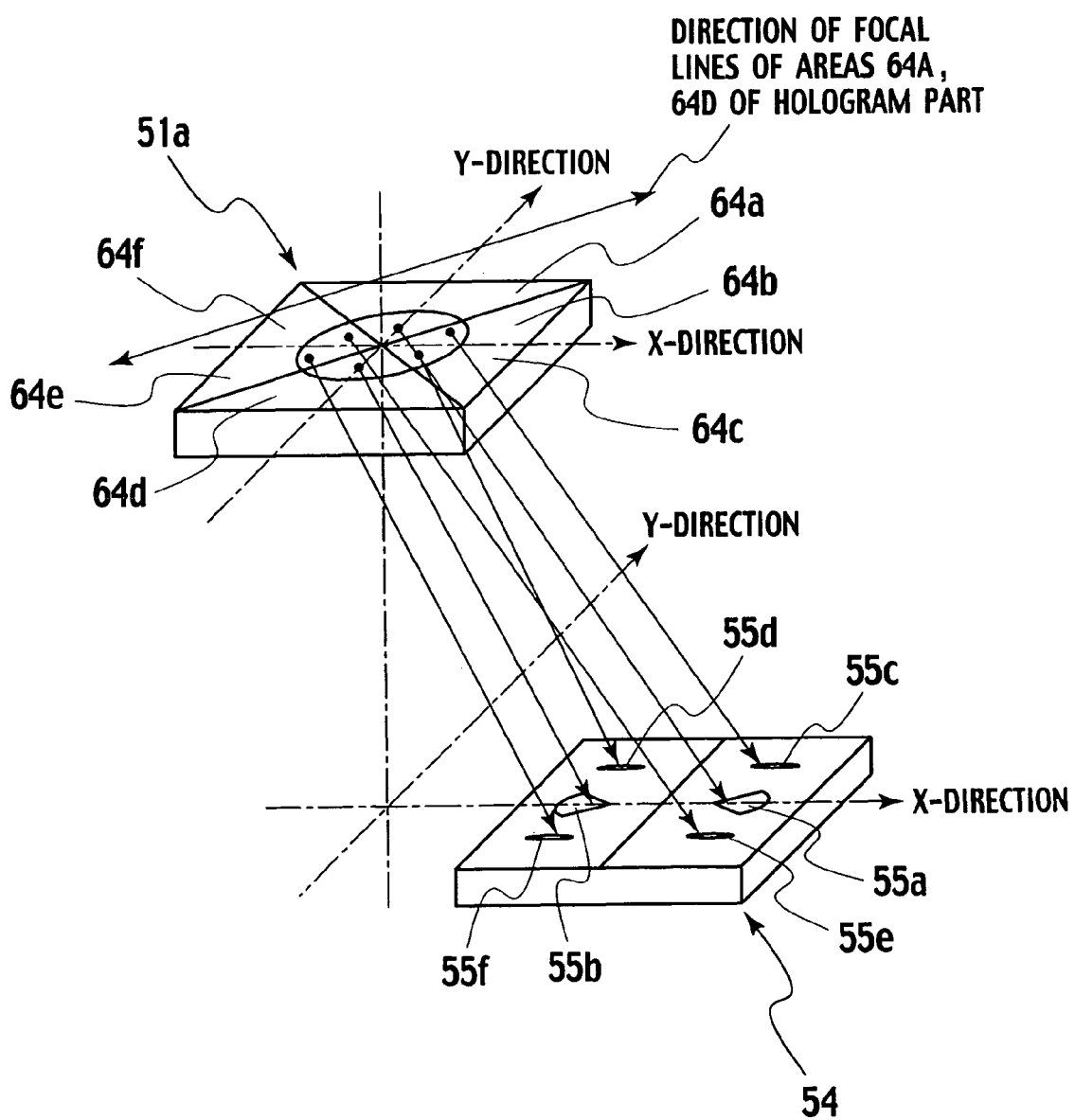
FIG. 29 is a view showing a relationship between divided areas of the hologram element of FIG. 27 and light spots formed on the photo detective element.
Figure 30:
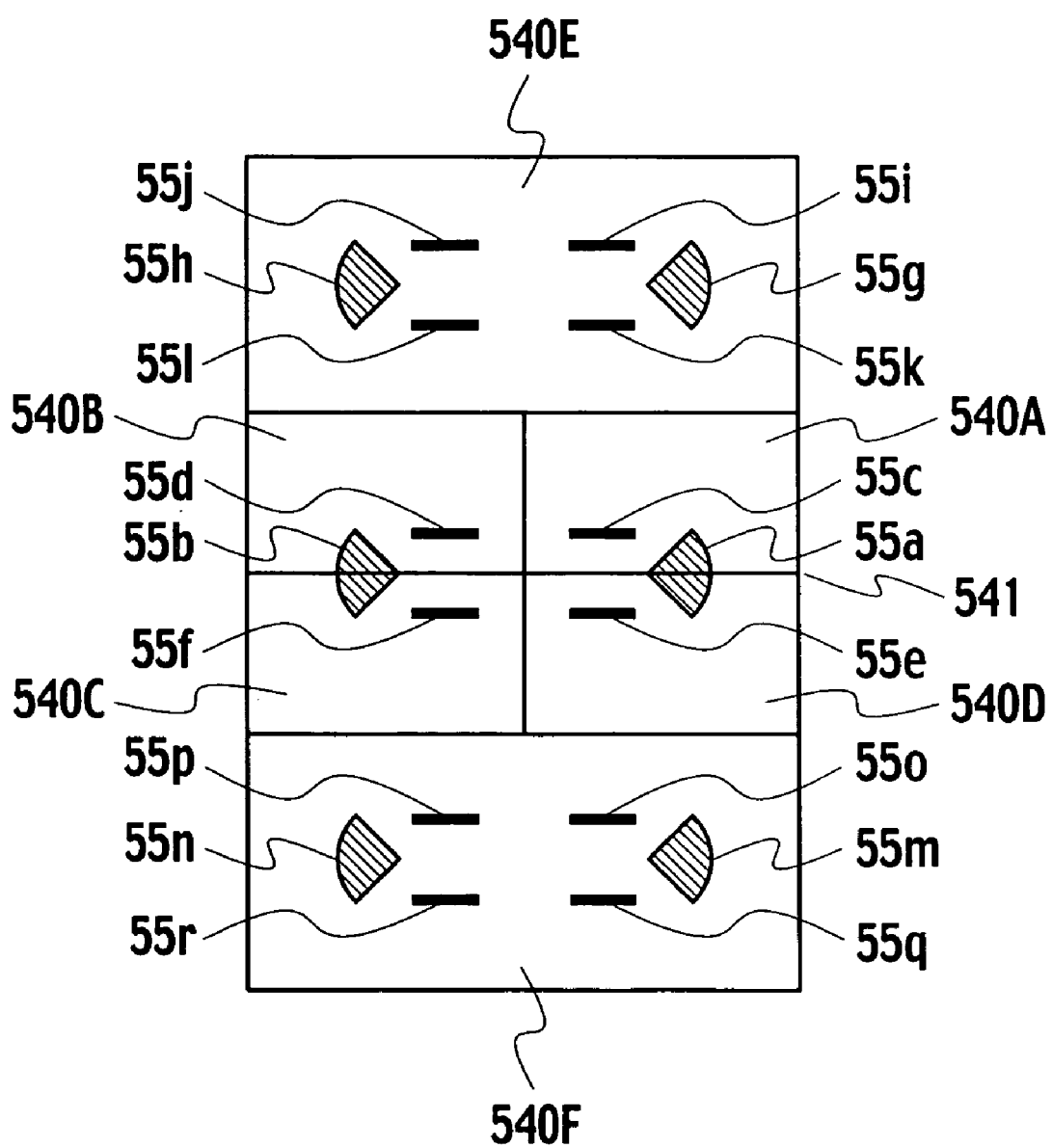
FIG. 30 is a view showing a constitution of the photo detective element of FIG. 25 and configurations of detective spots in focus.

Similarly, as the diffraction light diffracted by the divided area 64d of the hologram part 51a produces two focal lines due to the astigmatism impressed by the same area 64d and the photo detective element 54 is arranged between these focal lines, the diffraction light diffracted by the divided area 64d of the hologram part 51a is reversed about an axis in the same direction as the direction of the focal line between the hologram part 51a and the divided area 64a, forming a light spot whose configuration is shown with reference numeral 55b of FIGS. 26, 29 and 30, on the photo detective element 54. In these focal lines produced in the diffraction light from the divided area 64a, one focal line closer to the hologram part 51a has the same direction as that of one focal line closer to the hologram part 51a in the focal lines produced in the diffraction light from the divided area 64d.

On the other hand, the lights entering the remaining divided areas 64b, 64c, 64e and 64f of the hologram part 51a are respectively diffracted in the substantial-X direction and further impressed by astigmatism at the diffraction. In the two focal lines produced by the astigmatism, further, one focal line closer to the hologram element 51 extends with the same angle as the direction X, while the focal line closer to the hologram element 51 is positioned at the divided detective parts of the photo detective element 54. Therefore, the diffraction light from the divided area 64b of the hologram part 51a of FIGS. 26 and 27 forms a light spot whose diameter in the direction X is longer than its diameter in the direction Y, on the photo detective element 54, as shown with reference numeral 55c of FIGS. 26, 29 and 30.

Similarly, as shown in FIGS. 26, 29 and 30, the diffraction light from the divided area 64c, the diffraction light from the divided area 64e and the diffraction light from the divided area 64f form respective light spots whose each diameter in the direction X is longer than its diameter in the direction Y, on the photo detective element 54, as shown with reference numerals 55d, 55f and 55e in the figures, respectively.

Next, in these light spots 24a, 24b and 24c formed on the optical disc 24 (FIG. 25), the reflection light of the outermost light spot 24b is diffracted by the hologram part 51a as well as the light spot 24a and enters the photo detective element 54 while being impressed by astigmatism. Then, due to a difference in position between the light spot 24b and the light spot 24a, there are formed various light spots 55g, 55h, 55i, 55j, 55k and 55l on the photo detective element 54, as shown in FIGS. 26 and 30. Similarly, the reflection light of the remaining outermost light spot 24c forms various light spots 55m, 55n, 55o, 55p, 55q and 55r on the photo detective element 54, as shown in FIGS. 26 and 30.

Next, we describe an operation to detect a focus error signal in accordance with this embodiment of the invention. Now, we repeatedly refer to a situation where a relative distance (positioning) between the objective lens 23 and the optical disc 24 is established so that the lights converged by the objective lens 23 of FIG. 25 focalize on the optical disc 24, as "the relative distance is in the in-focus position". Assume that if the relative distance (positioning) between the objective lens 23 and the optical disc 24 is in the in-focus position, then respective light spots are formed on the divided detective parts 540A~540D, as shown in FIG. 30. Note that FIG. 30 shows the photo detective element 54 in view from the hologram element 51.

Repeatedly, the diffraction lights diffracted by the divided areas 64a and 64d of the hologram part 51a are impressed by astigmatism. Therefore, if the relative distance between the objective lens 23 (FIG. 25) and the optical disc 24 changes out of the in-focus position, the light spots formed on the divided detective parts 540A~540D of the photo detective 54 change from configurations shown with reference numerals 55a, 55b of FIG. 30 (in-focus position) to configurations shown with either reference numerals 55a', 55b' of FIG. 31 or reference numerals 55a", 55b" of FIG. 32 corresponding to the change (i.e. increasing or decreasing) in the relative distance, along a parting line 541 between the divided detective parts 540A, 540B and the divided detective parts 540D, 540C.

Figure 31:
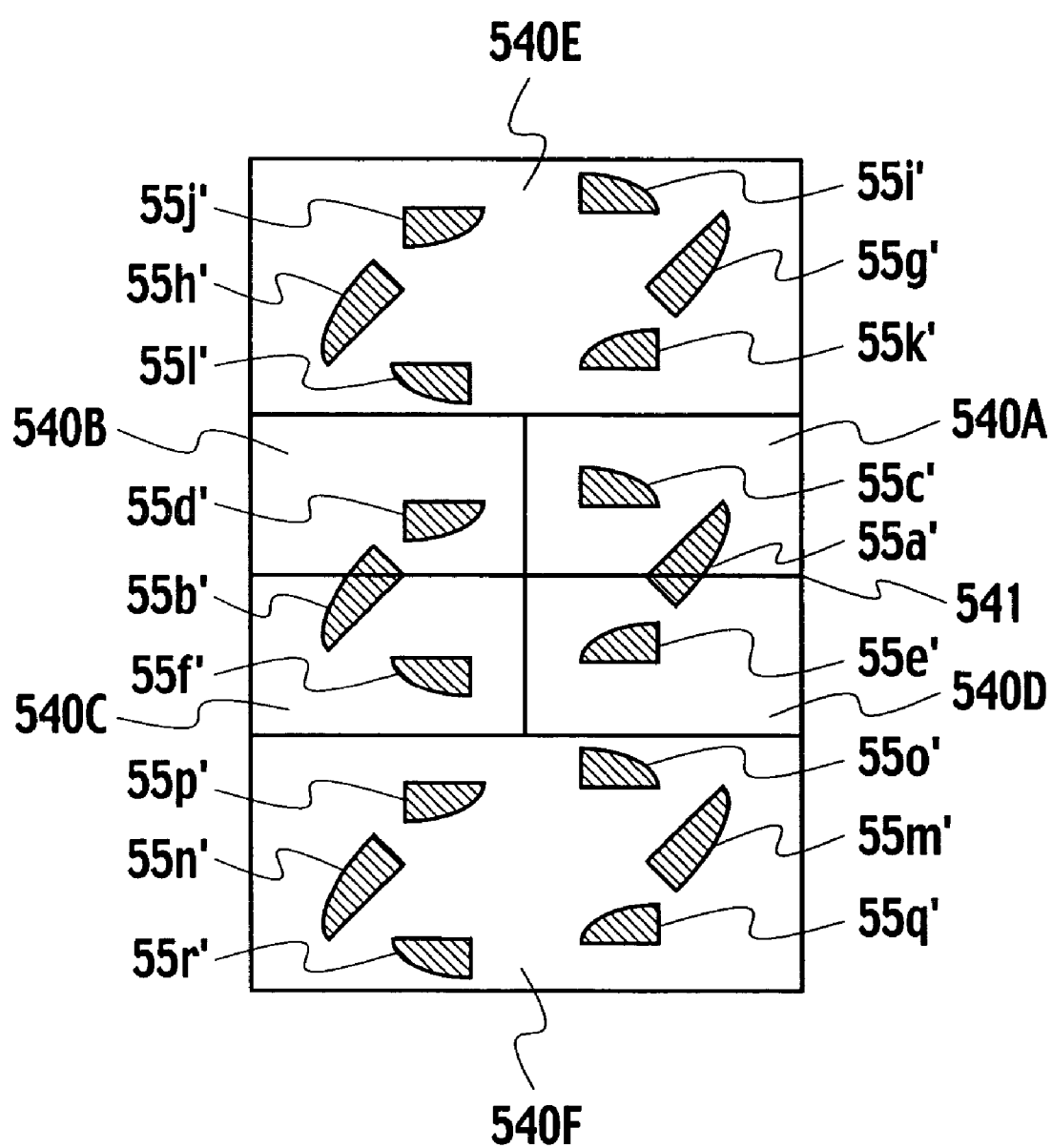
FIG. 31 is a view showing the constitution of the photo detective element of FIG. 25 and first configurations of detective spots when a relative distance between an objective lens and an optical disc changes in relation to the in-focus position.
Figure 32:
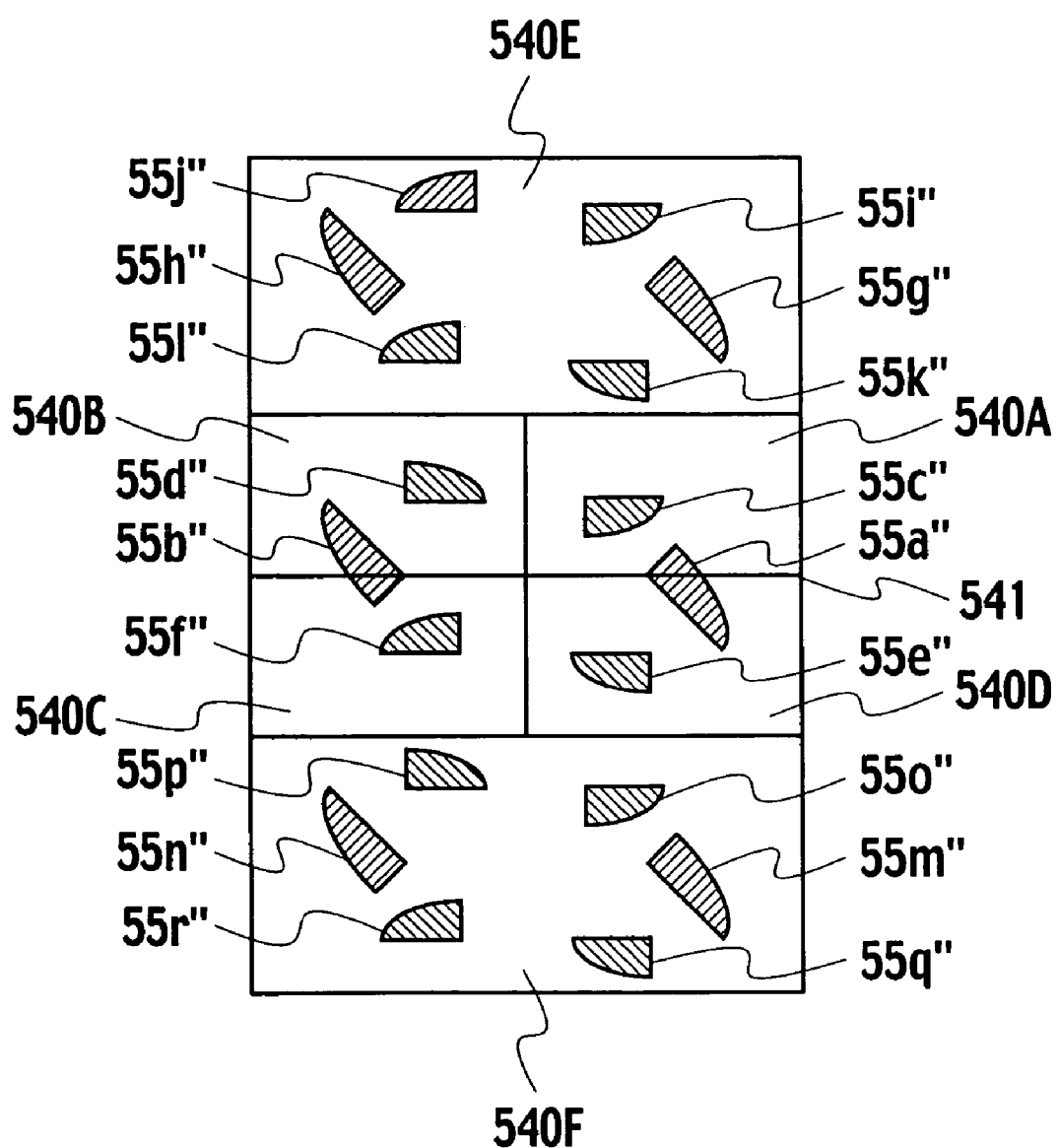
FIG. 32 is a view showing the constitution of the photo detective element of FIG. 25 and second configurations of the detective spots when the relative distance between the objective lens and the optical disc changes in relation to the in-focus position.

Assume that respective output signals from the respective divided detective parts 540A, 540B, 540C and 540D shown in FIGS. 30, 31 and 32 are represented by Va, Vb, Vc and Vd, respectively. Suppose that if the light spots in the in-focus position are represented as shown in FIG. 30, then there is obtained a calculation result of zero (0) by substituting the signals Va~Vd into the expression (Va+Vc)−(Vb+Vd).

On this assumption, it is noted that the situation (pattern of outputs) of FIG. 31 brings a positive value in the calculation of the above expression, while the situation (pattern of outputs) of FIG. 32 brings a negative value in the calculation. Thus, base on the above expression, it is possible to detect a focus error signal. It will be understood that this calculation method for obtaining the focus error signal is identical to the astigmatism method mentioned before.

Next, we describe an operation to detect a tracking error signal in accordance with this embodiment of the invention. It is noted that incident light entering the circular area 60 (FIG. 27) through which the reflection light of the light spot 24a on the optical disc 24 is transmitted in the hologram element 51 represents an optical-power distribution in the objective lens 23, similarly to the light spot formed on the photo detective element in case of the astigmatism method. In this embodiment, accordingly, respective areas (A1+A2), (B1+B2), (C1+C2) and (D1+D2) of FIG. 27 coincide with four divided detective parts 7A, 7B, 7C and 7D of the photo detective element 7 in the conventional optical pickup device in accordance with the astigmatism method shown in FIG. 1, respectively.

As mentioned before, as the diffraction light from the divided area 64a of FIG. 27 reverses about an axis in the same direction as the direction of the focal line between the hologram element 51 due to the astigmatism and the photo detective element 54 and enters both of the divided areas 540A and 540D of the photo detective element 54, light component diffracted by the area A1 of the hologram part 51a enters the divided detective part 540A, while light component diffracted by the area D2 of the hologram part 51a enters the divided detective part 540D.

Further, as the diffraction light from the divided area 64d of FIG. 27 reverses axially in the direction of the above focal line due to the astigmatism and enters both of the divided areas 540B and 540C of the photo detective element 54, light component diffracted by the area B2 of the hologram part 51a enters the divided detective part 540B, while light component diffracted by the area C1 of the hologram part 51a enters the divided detective part 540C.

Additionally, the diffraction light from the divided area 64b (light component diffracted by the area A2), the diffraction light from the divided area 64c (light component diffracted by the area B1), the diffraction light from the divided area 64e (light component diffracted by the area C2) and the diffraction light from the divided area 64f (light component diffracted by the area D1) enter the divided detective parts 540A, the divided detective parts 540B, the divided detective parts 540C and the divided detective parts 540D, respectively. Therefore, by substituting the output signals Va~Vd from the divided detective parts 540A~540D into the expression (Va+Vb)−(Vc+Vd) in the same manner as the astigmatism method, it is possible to detect a tracking error signal in accordance with the push-pull method. Also in the phase-difference method, it is possible to detect a tracking error signal by comparing a phase of (Va+Vc) with a phase of (Vb+Vd), which is similar to the astigmatism method.

Figure 7:
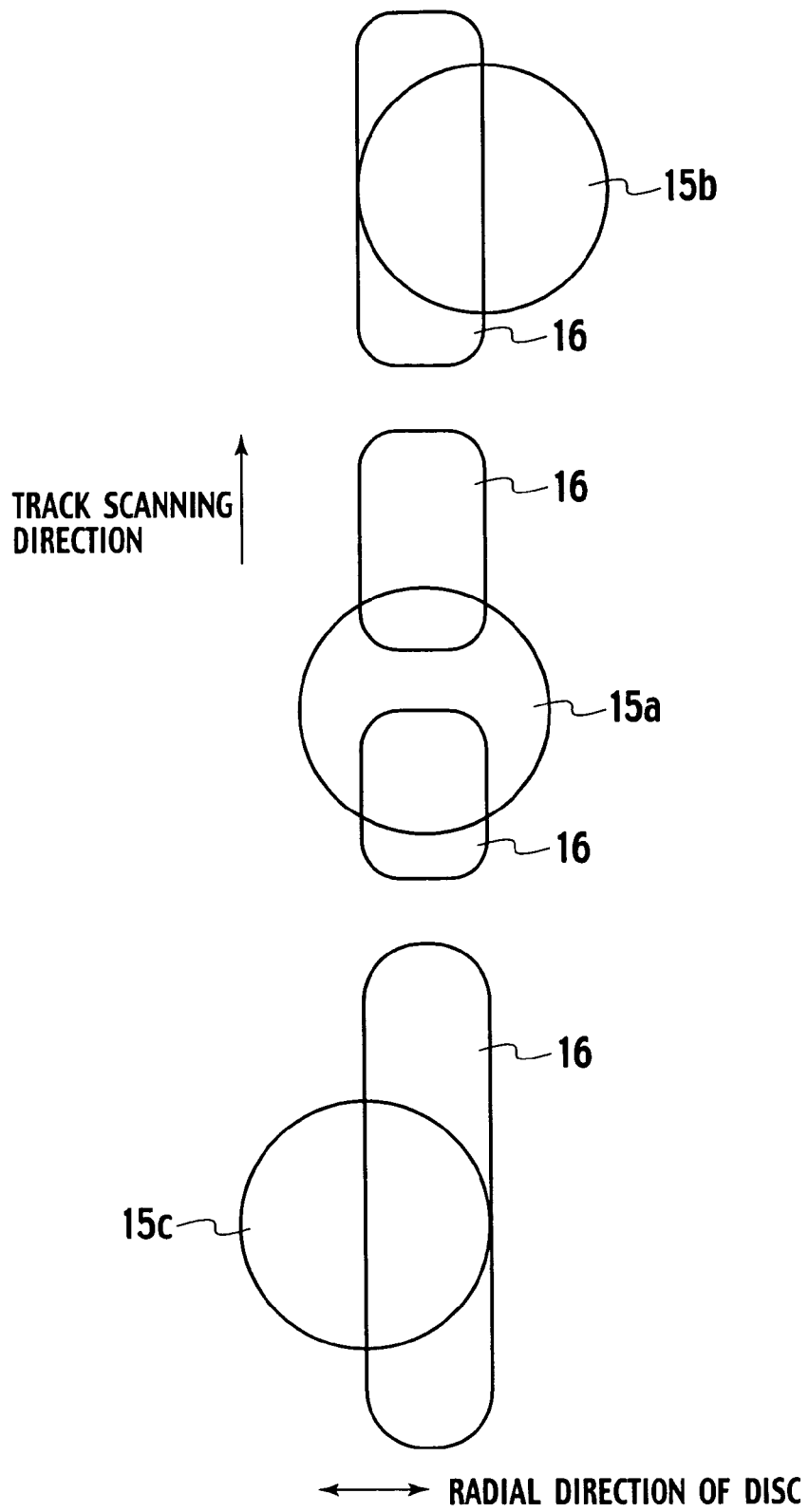
FIG. 7 is a view showing light spots in accordance with a three-beam method.
Figure 8:
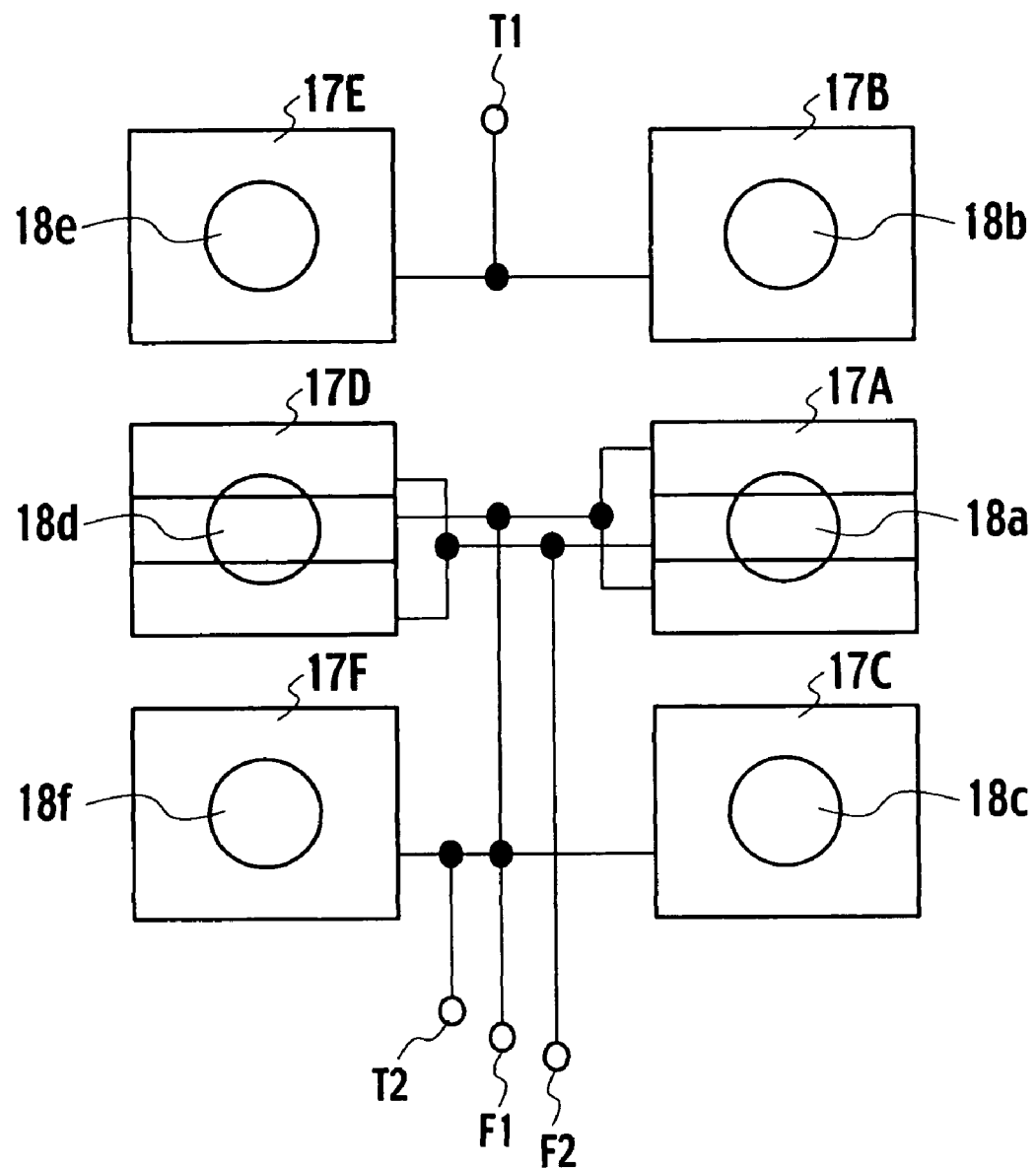
FIG. 8 is a view showing a constitution of a photo detective element and its detective areas under condition that the three-beam method is applied to the optical pickup device of FIG. 5.

In the three-beam method, the diffraction grating part 51b formed on the surface of the hologram element 51 (FIGS. 25 and 26) opposing the semiconductor laser 50 diffracts the light radiated from the semiconductor laser 50 to three lights, forming three light spots 24a, 24b and 24c on the optical disc 24. On the optical disc, the three light spots 24a, 24b and 24c are arranged in the same manner as the afore-mentioned positional relationship between the track of FIG. 7 and the spots 15a (corres. to spot 24a of FIG. 26), 15b (corres. to spot 24b of FIG. 26) and 15c (corres. to spot 24c of FIG. 26) in the related art.

The reflection light of the light spot 24b formed on the photo disc 24 enters the photo detective element 54 in the same manner as the light spot 24a mentioned above and forms six light spots 55g, 55h, 55i, 55j, 55k and 55l on the divided detective part 540E, as shown in FIG. 30. Similarly, the reflection light of the light spot 24c form six light spots 55m, 55n, 55o, 55p, 55q and 55r on the divided detective part 540F, as shown in FIG. 30.

As before, the tracking error signal can be detected by calculating (Ve−Vf) from Ve and Vf as the outputs of the divided detective parts 540E and 540F with the use of a phenomenon that if the relative position of the center light spot 24a to the track of the optical disc changes in the radial direction, then the photo detective powers of the divided detective part 540E and the divided detective part 540F both receiving the reflection lights of the outside light spots 24b, 24c increase or decrease mutually. Note that in order to detect information recorded in the optical disc 24, it is required to only calculate the summation of respective output signals from the divided detective parts 540A~540D, that is, (Va+Vb+Vc+Vd).

The above explanation is based on the premise that the lights entering the divided areas 64a and 64d of the hologram part 51a (FIG. 27) containing a direction equal to the track direction are diffracted in the substantial-X direction (i.e. a direction making a right angle with the track direction Y).

However, this characteristic of the divided areas 64a and 64d of the hologram part 51a may be modified so as to diffract incident lights in the range of approx. 90 degrees±20 degrees to the track direction Y. Additionally, the other divided areas 64b, 64c, 64e and 64f of the hologram part 51a, which do not contain a direction equal to the track direction, may be characterized by diffracting incident lights in the range of approx. 90 degrees±20 degrees to the track direction Y as well.

6th. Embodiment

In the fifth embodiment, the incident lights entering the divided areas 64b, 64c, 64e and 64f of the hologram part 51a are diffracted in the substantial-X direction and impressed by the astigmatism. Further, in two focal lines produced in each diffraction light by the astigmatism, the focal line closer to the hologram element 51 is positioned at each divided detective part of the photo detective element 54 while making the same angle as the direction X.

Therefore, the reflection light of the light spot 24a forms the light spot 55c long in the substantial-X direction and short in the substantial-Y direction on the photo detective element 54 (see FIGS. 26, 29 and 30). Similarly, as shown in FIGS. 26, 29 and 30, the diffraction lights from the divided area 64c, the divided area 64e and the divided area 64f form the light spot 55d, the light spot 55e, and the light spot 55f which are long in the substantial-X direction and short in the substantial-Y direction, on the photo detective element 54, respectively. Meanwhile, the incident lights entering the four divided areas 64b, 64c, 64e and 64f of the hologram part 51a may be diffracted in the substantial-X direction and further impressed by not astigmatism but only converging power at the diffraction.

The sixth embodiment of the invention is provided from this point of view. That is, the basic constitution of the sixth embodiment is similar to that of the fifth embodiment in that the opposing divided areas 64a and 64d are characterized by diffracting the reflection lights from the optical disc and further impressing the astigmatism on the diffraction lights. Different from the fifth embodiment, however, the lights entering the remaining four divided areas 64b, 64c, 64e and 64f are together diffracted in the substantial-X direction and further impressed by not astigmatism but only converging power at the diffraction.

Figure 33:
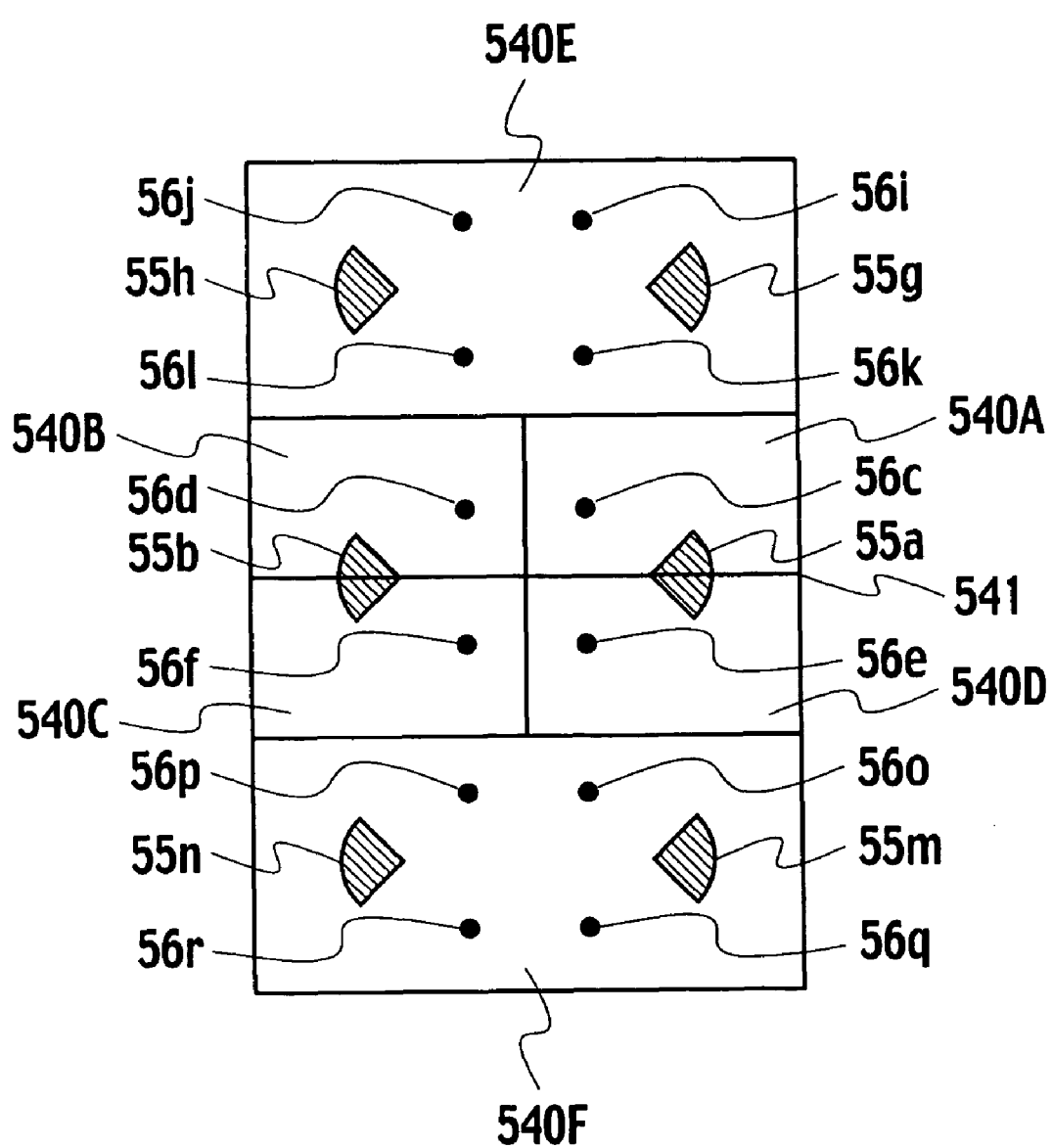
FIG. 33 is a view showing the constitution of the photo detective element of the sixth embodiment of the present invention and configurations of detective spots in focus.

Consequently, when the relative distance between the objective lens 23 and the optical disc 24 is established so as to just focalize on the disc 24, the diffraction lights from the divided areas 64b, 64c, 64e and 64f form the smallest light spots at the photo detective element 54 as shown with reference numerals 56c~56f, 56i~56l and 56o~56r of FIG. 33. In the figure, the light spots 56c~56f on the respective divided detective parts of the photo detective element 54 are brought by the diffraction lights produced since the reflection light of the light spot 24a is diffracted by the divided areas 64b, 64c, 64e and 64f.

Similarly, the light spots 56i~56l are brought by the diffraction lights produced since the reflection light of the light spot 24b is diffracted by the divided areas 64b, 64c, 64e and 64f, while the light spots 56o~56r are brought by the diffraction lights produced since the reflection light of the light spot 24c is diffracted by the divided areas 64b, 64c, 64e and 64f. In FIGS. 32~35, light spots identical to those of FIG. 30 are indicated with the same reference numerals, respectively.

Figure 34:
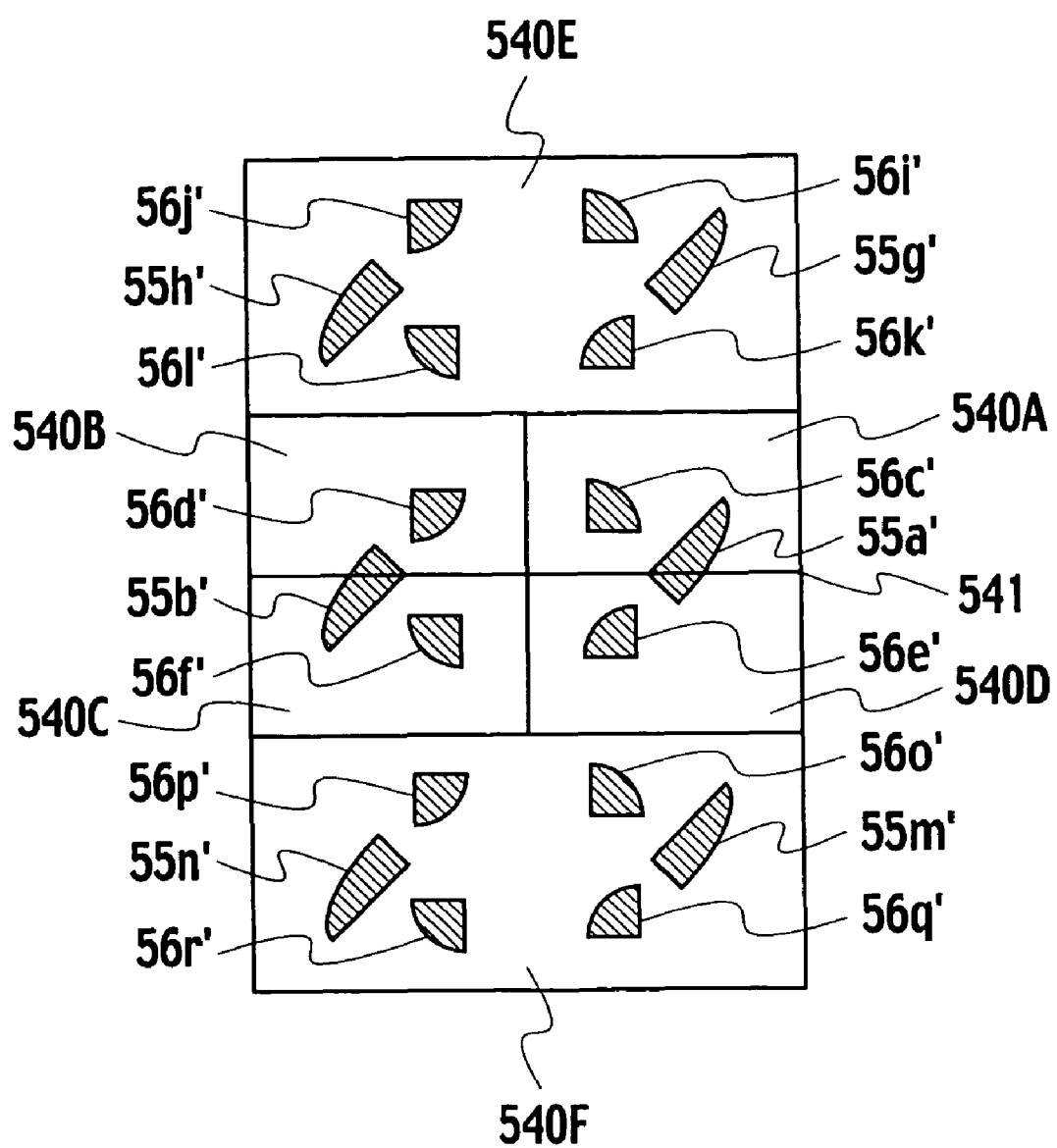
FIG. 34 is a view showing the constitution of the photo detective element of the sixth embodiment of the present invention and first configurations of detective spots when a relative distance between an objective lens and an optical disc changes in relation to the in-focus position.

According to the sixth embodiment of the invention, if the relative distance between the objective lens 23 and the photo disc 24 changes, the configurations of the light spots on the photo detective element 54 by the diffraction lights by the divided areas 64b, 64c, 64e and 64f change as shown with reference numerals 56c'~56f', 56i'~56l' and 56o'~56r' of FIG. 34 or reference numerals 56c"~56f", 56i"~56l" and 56o"~56r" of FIG. 35, corresponding to the change (increasing or decreasing) in the relative distance.

Thus, also in the sixth embodiment, it is possible to detect the focus error signal as well as the fifth embodiment. Additionally, as the incident lights entering six divided detective parts 540A~540F of the photo detective element 54 are diffraction lights similar to lights obtained by the divided areas of the hologram element 51, it is also possible to detect tracking error signal similarly to the fifth embodiment.

Additionally, according to the sixth embodiment, since the light spots 55c, 55d, 55e, 55f, 55i, 55j, 55k, 55l, 55o, 55p, 55q and 55r are minimized in size when the relative distance between the objective lens 23 and the photo disc 24 is established so as to focalize on the disc 24, it is possible to miniaturize the photo detective element 54 advantageously.

The present invention is not limited to the above-mentioned embodiments only. For instance, in FIG. 11, it is noted that the divided detective parts 260A, 260B, 260C and 260D (see FIG. 11) are adapted so as to receive the diffraction lights from the areas A1 and A2; B1 and B2; C1 and C2 and D1 and D2 of the hologram element 21, respectively. However, the structure of the optical pickup device may be modified so as to receive the diffraction lights from the areas A1 and A2 by individual divided detective parts and further add photoelectric transfer signals from the individual divided detective parts. Of course, this modification is applicable to the other areas B1 and B2; C1 and C2; and D1 and D2, similarly.

In conclusion, according to the present invention, it is possible to realize high reliability and miniaturization of installation, both of which are features of an optical pickup device using a hologram element. Additionally, since the optical pickup device of the invention is capable of detecting a servo-error signal with the use of an electric-signal calculating circuit identical to that in the astigmatism method, there is no need of modifying a commonly-used electric-signal processing circuit for detecting the servo-error signal, allowing the electric-signal processing circuit to be used as it is.

Finally, it will be understood by those skilled in the art that the foregoing descriptions are nothing but embodiments and various modifications of the disclosed optical pickup device and therefore, various changes and modifications may be made within the scope of claims.

What is claimed is:

1. An optical pickup device of comprising:
a light source for radiating light;
a diffraction grating part that divides the light radiated from the light source into a main beam which is a non-diffraction light and two sub-beams which are diffraction light, respectively;
an objective lens that converges each of the main beam and the two sub-beams divided by the diffraction grating part onto an optical disc;
a hologram element that diffracts a reflection light of each of the main beam and the two sub-beams from the optical disc to a predetermined direction, each of the main beam and the two beams entering the hologram element through the objective lens;
and a photo detective element that receives the reflection light of each of the main beam and two sub-beams diffracted by the hologram element and outputs an electric signal corresponding to an optical power of the received lights,
wherein the hologram element has an incident area for the reflection light of each of the main beam and two sub-beams from the optical disc, which is divided into six divided areas by parting lines making axis-symmetric angles with a direction of a track on the optical disc, the direction of the track being obtained by projecting the track on the hologram element, the six divided areas including first and second divided areas containing a same direction as the direction of the track, the first and second divided areas being characterized by diffracting a light to one or more directions in a range of 90 degrees±20 degrees to the direction of the track and each impressing astigmatism on resulting diffraction lights, a set of two focal lines produced by the astigmatism impressed by each of the first and second divided areas extending 45 degrees to the direction of the track projected on the hologram element, one of the two focal lines in one of the two sets closer to the hologram element extending in a same direction as one of the two focal lines in the other of the two sets closer to the hologram element, the six divided areas includes third and fourth divided areas both adjoining the first divided area and fifth and sixth divided areas both adjoining the second divided area, each of the third to the sixth divided areas diffracting light to one or more directions in a range of 90 degrees±20 degrees to the direction of the track and each impressing astigmatism on resulting diffraction light, one of two first focal lines produced by the astigmatism impressed by each of the third to sixth divided areas closer to the hologram element extending 90 degrees to the direction of the track projected on the detection optical element, and the photo detective element is arranged between the two focal lines produced by the astigmatism impressed by the first divided area and between the two focal lines produced by the astigmatism impressed by the second divided area, and receives one of two focal lines produced by the astigmatisms impressed by each of the third to sixth divided areas closer to the hologram element, wherein at least in a state where the light through the objective lens converges on the optical disc to form the light spot, the diffraction light of the reflection light of the main beam emitted from the first divided area is received by both of first and second divided detective parts of the photo detective element, which are divided by a first parting line extending in a same direction as a direction of the diffraction, the diffraction light of the reflection light of the main beam emitted from the second divided area is received by both of third and fourth divided detective parts of the photo detective element which are divided by a second parting line extending in a same direction as a direction of the diffraction, the diffraction light emitted from the third divided area and the diffraction light of the reflection light of the main beam emitted from the fourth divided area are converged by the hologram element and further received by the first and second divided detective parts individually, and the diffraction light emitted from the fifth divided area and the diffraction light of the reflection light of the main beam emitted from the sixth divided area are converged by the hologram element and further received by the third and fourth divided detective parts individually, and wherein at least in the state where the light spot has a smallest diameter, a first light spot, which is formed on either of the first and the second divided detective parts of the reflection light of the main beam emitted when diffraction lights from the third and the fourth divided areas reach the photo detective element, has one diameter "$d1x$" larger than another diameter "$d1y$" where the diameter "$d1x$" is a diameter in a same direction as a first parting line between the first divided detective part and the second divided detective part and the diameter "$d1y$" is a diameter in a direction perpendicular to the first parting line, and a second light spot, which is formed on either of the third and the fourth divided detective parts when diffraction lights of the reflection light of the main beam emitted from the fifth and the sixth divided areas reach the photo detective element, has one diameter "$d2x$" larger than another diameter "$d2y$" where the diameter "$d2x$" is a diameter in a same direction as a second parting line between the third divided detective part and the fourth divided detective part and the diameter "$d2y$" is a diameter in a direction perpendicular to the second parting line.

2. The optical pickup device of claim 1, wherein the photo detective element further comprises:

a fifth divided photo detective part that receives a diffractive light of the reflection light of one of the two sub-mains emitted from each of the first to sixth divided areas; and a sixth divided photo detective part that receives a diffractive light of the reflection light of the other of the two sub-beams emitted from each of the first to sixth divided areas.

* * * * *